US012750319B2

(12) United States Patent
Jain

(10) Patent No.: US 12,750,319 B2
(45) Date of Patent: Sep. 29, 2026

(54) MANAGEMENT OF PROTOCOL DATA UNIT SET DISCARDING DUE TO NETWORK CONGESTION

(71) Applicant: Dell Products L.P., Round Rock, TX (US)

(72) Inventor: Hemant Kumar Bhawarlal Jain, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 116 days.

(21) Appl. No.: 18/656,306

(22) Filed: May 6, 2024

(65) Prior Publication Data

US 2025/0343765 A1 Nov. 6, 2025

(51) Int. Cl.
*H04W 76/20* (2018.01)
*H04L 47/11* (2022.01)
(Continued)

(52) U.S. Cl.
CPC .............. *H04L 47/32* (2013.01); *H04L 47/11* (2013.01); *H04L 47/24* (2013.01); *H04W 28/06* (2013.01)

(58) Field of Classification Search
CPC ......... H04L 47/32; H04L 47/11; H04L 47/24; H04W 28/06
See application file for complete search history.

(56) References Cited

U.S. PATENT DOCUMENTS 9,112,797 B2 * 8/2015 Ludwig .................... H04W 8/04
2011/0267948 A1 * 11/2011 Koc ...................... H04W 28/12 370/235

(Continued)

FOREIGN PATENT DOCUMENTS

JP 5456203 B2 * 3/2014 ........ H04W 28/0231
WO WO-2010056158 A1 * 5/2010 ............ H04W 72/52

(Continued)

OTHER PUBLICATIONS

"extended Reality for NR", 3GPP, [https://www.3gpp.org/technologies/xr-nr], Jul. 23, 2023, 4 pages.
"5G architecture support for XR and media services" 3GPP, [https://www.3gpp.org/technologies/xr-sa2], Aug. 31, 2023, 5 pages.
"Summary Report from 3GPP plenaries (mainly RAN) #99", 5GPPP, [https://standards-tracker.5g-ppp.eu/online-tool-standards-tracker/summary-report-3gpp-plenaries-mainly-ran-99-rotterdam-netherlands-20], Rotterdam, the Netherlands, Mar. 20-24, 2023, retrieved Jun. 30, 2025, 11 pages.
"5G; NG-RAN; NR user plane protocol (3GPP TS 38.425 version 16.1.0 Release 16)" ETSI TS 138 425, V16.1.0, Jul. 2020, 28 pages.
"3rd Generation Partnership Project; Technical Specification Group Radio Access Network; NR; Study on XR enhancements for NR (Release 18)" 3GPP TR 38.835, V18.0.1, Apr. 2023, 122 pages.

(Continued)

*Primary Examiner* — Umar Cheema
*Assistant Examiner* — Golam Mahmud
(74) *Attorney, Agent, or Firm* — Amin, Turocy & Watson, LLP

(57) ABSTRACT

Discarding of PDU sets associated with DRBs of a RAN can be managed. A discard manager component (DMC) can determine whether a congestion condition exists with regard to a DRB(s) associated with a DU or CU-UP based on congestion information associated with DRB(s). If congestion is in DRB(s) associated with DU, DU can communicate a congestion indicator to DMC of the CU-UP. In response to detecting a congestion condition associated with DRB(s), DMC can determine a PDU set, present in buffer of CU-UP and associated with congested DRB(s), that has highest PSI value, set highest PSI value as threshold PSI value for discarding, and discard, from buffer, data packet(s) of PDU set(s), associated with congested DRB(s), that satisfies threshold PSI value. If congestion is still not resolved, DMC can adjust threshold PSI value, and discard data packet(s) of PDU set(s) that satisfies adjusted threshold PSI value.

20 Claims, 13 Drawing Sheets

(51) Int. Cl.

| | |
|---|---|
| ***H04L 47/24*** | (2022.01) |
| ***H04L 47/32*** | (2022.01) |
| ***H04W 8/22*** | (2009.01) |
| ***H04W 28/06*** | (2009.01) |
| ***H04W 80/02*** | (2009.01) |

(56) References Cited

U.S. PATENT DOCUMENTS

2024/0275732 A1* 8/2024 He .......................... H04L 47/32
2024/0334244 A1* 10/2024 Taneja ................ H04L 43/0882
2024/0334529 A1* 10/2024 Lee ......................... H04W 8/22

FOREIGN PATENT DOCUMENTS

WO WO-2011120581 A1 * 10/2011 ........ H04W 28/0231
WO WO-2024205279 A1 * 10/2024 ............ H04W 28/06
WO WO-2024209095 A1 * 10/2024 ............. H04L 47/32

OTHER PUBLICATIONS

"3rd Generation Partnership Project; Technical Specification Group Radio Access Network; NG-RAN; Architecture description (Release 18)" 3GPP TS 38.401, V18.1.0, Mar. 2024, 157 pages.

Nokia, Qualcomm. "Updated WID on XR Enhancements for NR" RP-230786, 3GPP TSG RAN Meeting #99, Rotterdam, Netherlands, Mar. 20-23, 2023, 4 pages.

* cited by examiner

MANAGEMENT OF PROTOCOL DATA UNIT SET DISCARDING DUE TO NETWORK CONGESTION

BACKGROUND

Communication networks can enable users to use devices to wirelessly connect to a communication network and communicate with other devices (e.g., wireless devices or other communication devices). A device, such as a mobile device (e.g., smart phone or other mobile wireless device) can connect (e.g., wirelessly connect) to a cell (e.g., cell of a base station) or other access point associated with a radio access network (RAN) to facilitate connection to a communication network. Devices, via connection to the RAN and communication network, can utilize various types of services and applications of or associated with the communication network.

The above-described description is merely intended to provide a contextual overview regarding communication systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise determining, by a system comprising at least one processor, that a congestion condition exists with regard to a downlink connection associated with a data resource bearer based on congestion information associated with the data resource bearer. The method also can comprise: in response to determining that the congestion condition exists, determining, by the system, from a group of protocol data unit sets stored in a buffer memory of a central unit user plane and associated with a group of data resource bearers, comprising the data resource bearer, a data packet of a protocol data unit set to discard based on a priority level associated with the protocol data unit set as compared to other priority levels of other protocol data unit sets of the group of protocol data unit sets, wherein the protocol data unit set can be associated with the data resource bearer.

In certain embodiments, the disclosed subject matter can comprise a system that can comprise at least one memory that can store computer executable components, and at least one processor that can execute computer executable components stored in the at least one memory. The computer executable components can comprise a congestion detector that can detect a congestion condition associated with a group of data resource bearers based on congestion information associated with the group of data resource bearers. The computer executable components also can comprise a discard manager, wherein, in response to detection of the congestion condition, the discard manager can determine, from a group of protocol data unit sets present in a buffer memory of a central unit user plane and associated with the group of data resource bearers, a data packet of a protocol data unit set to discard based on a priority level associated with the protocol data unit set as compared to other priority levels of other protocol data unit sets of the group of protocol data unit sets.

In still other embodiments, the disclosed subject matter can comprise a non-transitory machine-readable medium, comprising executable instructions that, when executed by at least one processor, can facilitate performance of operations. The operations can comprise detecting a congestion condition associated with a group of data resource bearers based on congestion information associated with the group of data resource bearers. The operations also can comprise: in response to detecting the congestion condition, determining, from a group of protocol data unit sets present in a buffer memory of a central unit user plane and associated with the group of data resource bearers, a data packet of a protocol data unit set that can be disposed based on a priority level associated with the protocol data unit set relative to other priority levels of other protocol data unit sets of the group of protocol data unit sets, wherein the protocol data unit set can be associated with a data resource bearer of the group of data resource bearers.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
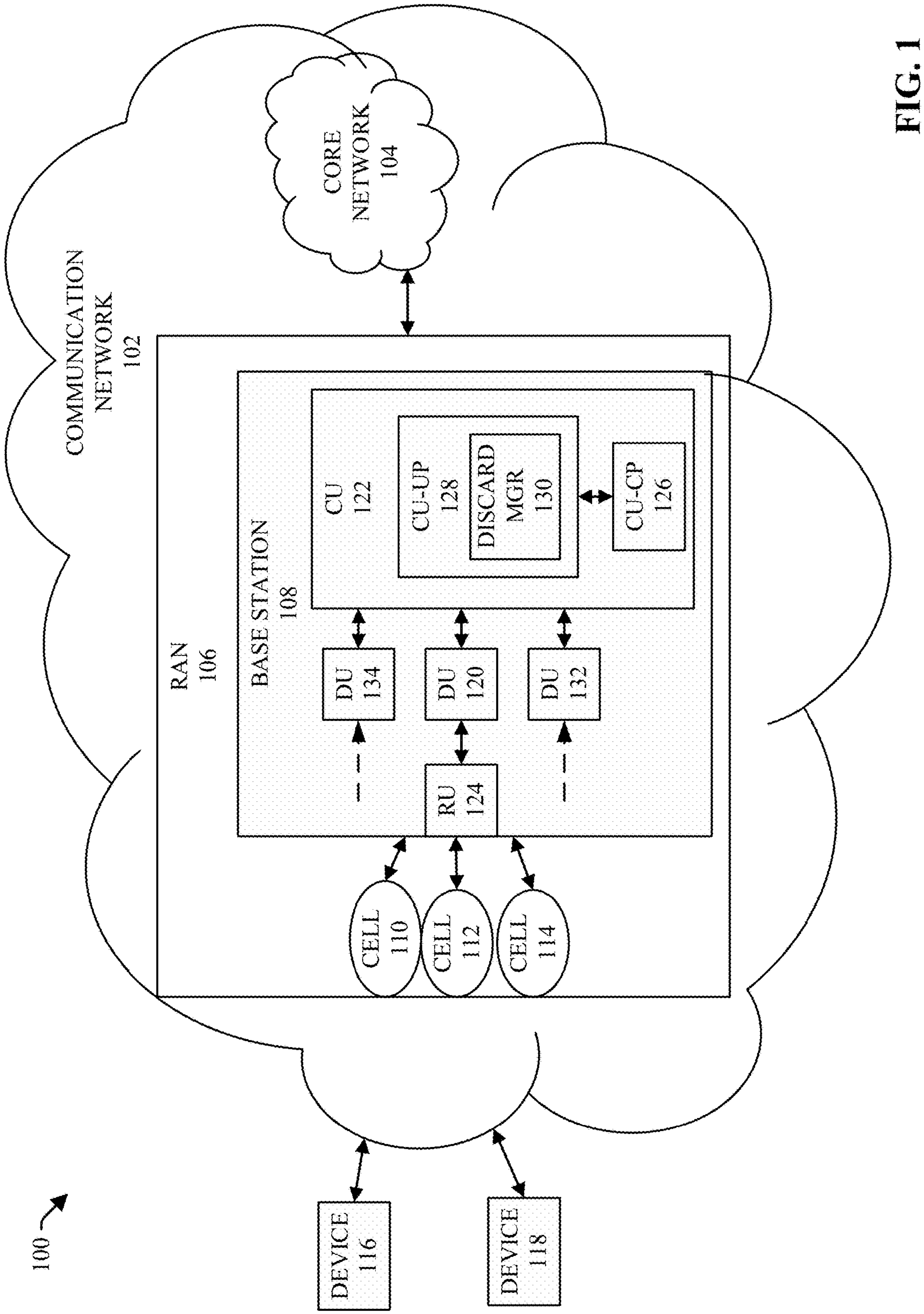
FIG. 1 illustrates a block diagram of a non-limiting example system that can desirably manage and mitigate discarding of data, such as data packets of protocol data unit (PDU) sets, and manage and mitigate congestion in a radio access network (RAN) of a communication network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to management of protocol data unit (PDU) set discarding due to network congestion on a radio access network (RAN) of a communication network (e.g., communication network comprising a core network that can facilitate wireless communication of information between devices, including wireless devices). A device, such as a mobile device (e.g., user equipment (UE), smart phone, or other mobile wireless device) can connect (e.g., wirelessly connect) to a cell (e.g., cell of a base station) or other access point associated with the RAN of the communication network to facilitate connection to the communication network.

Certain applications, such as extended reality (XR) applications, can generate periodic data bursts, where each data burst can comprise one or more PDU sets. Each PDU set can comprise one or more PDUs, wherein each PDU can comprise (e.g., can carry) a data payload of one unit of information generated at the application level (e.g., a frame or video slice). Each PDU set can be associated with a PDU set importance (PSI) value (e.g., PSI indicator or flag having a certain value), which can provide the relative importance or priority of the PDU set when compared to other PDU sets within the quality of service (QOS) flow. The PSI values can have range, for example, from 0 to 15, wherein PSI 0 can indicate that a PDU set has a highest importance or priority, and PSI 15 can indicate that a PDU set has a lowest importance or priority.

With regard to fifth generation (5G) or other new radio (NR) generation (e.g., xG, wherein x can be a number greater than 5), a RAN can comprise base stations, such as a gNodeB (gNB), that can be disaggregated into a central unit-user plane (CU-UP) (e.g., gNB-CU-UP), a central unit-control plane (CU-CP) (e.g., gNB-CU-CP), and a distributed unit (DU) (e.g., gNB-DU). The CU-UP and DU can be part of the user plane node, with the CU-UP hosting packet data convergence protocol (PDCP) and service data adaption protocol (SDAP) entities, and the DU can host the radio link control (RLC), medium access control (MAC), and physical (PHY) layers.

There can be instances where there can be congestion in the DU or CU-UP. For instance, one or more data resource bearers (DRBs) associated with the DU or CU-UP can be experiencing an undesirable level of congestion. With regard to DU congestion, the congestion may impact (e.g., negatively impact) the entire DU or may only impact one or more specific cells of the DU, but not other cells of the DU.

With some existing techniques, when congestion occurs in the DU, the DU can send a downlink data delivery status (DDS) message with a desired buffer size (DBS) equal to 0 (DBS=0) for a DRB impacted due to congestion. When the entire DU is experiencing congestion, the DU can consider all DRB present in the DU, and when a specific cell(s) is/are experiencing congestion, the DU can consider all DRB present in the congested cell(s). It is noted that the DU also can send a downlink DDS message with DBS=0 to the CU-UP under normal circumstances when the DU is not experiencing congestion. For example, the DU can send a downlink DDS message with DBS=0 to the CU-UP when the DU does not want or need more data during a particular time.

With some existing techniques, upon receiving a downlink DDS message with DBS=0 from the DU, the CU-UP can stop sending downlink data to the DU. However, this can lead to or result in an undesirably (e.g., unwanted, unacceptable, inefficient, or suboptimal) increased buffer (e.g., an increase in the amount of data stored in the buffer of the CU-UP) and increased delay, which can lead to or result in undesirable triggering of PDCP service data unit (SDU) discarding (e.g., due to a PDCP discard timer elapsing or PDCP buffer threshold-based discarding of data from the buffer). For a DRB that is carrying data traffic for XR services, such handling of data traffic using such existing techniques can lead to or result in undesirable (e.g., unwanted, unacceptable, inefficient, suboptimal, or otherwise undesired) discarding of a PDCP SDU(s) belonging to a PDU set(s) of higher importance (e.g., a PDU set(s) associated with a lowest or lower PSI value (e.g., associated with a highest or higher priority level) may be undesirably discarded).

It can be desirable (e.g., wanted, useful, efficient, advantageous, or optimal) to reduce undesirable increases in the amount of data stored in the buffer of the CU-UP, reduce undesirable delay of communication of downlink data, and reduce undesirable SDU and PDU set discarding (e.g., undesirable discarding of data packets of PDU sets from the buffer of the CU-UP). The disclosed subject matter can address and overcome these and other deficiencies and challenges of these existing techniques with regard to managing and responding to congestion in the DU and CU-UP, and discarding of PDU sets when the DU or CU-UP is or are experiencing congestion. In that regard, it can be desirable (e.g., wanted, useful, efficient, advantageous, beneficial, or optimal) to mitigate (e.g., reduce or minimize) undesired increases in the amount of data stored in the buffer, mitigate undesired delay associated with communication of data, and mitigate undesired discarding of data packets of PDU sets and SDUs due to congestion in the DU or CU-UP.

The disclosed subject matter can employ enhanced data (e.g., PDU sets and/or other data) management and discarding techniques that can desirably (e.g., suitably, enhancedly, or optimally) mitigate (e.g., reduce or minimize) undesired increases in the amount of data stored in the buffer, mitigate undesired delay associated with communication of data, and mitigate undesired discarding of data packets of PDU sets and SDUs due to congestion in the DU or CU-UP.

To that end, techniques that can desirably (e.g., automatically, dynamically, suitably, reliably, efficiently, enhancedly, and/or optimally) manage and mitigate discarding of data, such as data packets of PDU sets (e.g., due to a congestion condition associated with a DRB(s) associated with a DU or CU-UP), and manage and mitigate congestion in the DU or CU-UP, are presented. A system can comprise a RAN that can comprise a CU-UP and one or more DUs. The CU-UP can comprise or be associated with a discard manager component that can desirably perform and manage discarding of data packets of PDU sets (e.g., due to a congestion condition associated with a DRB(s) associated with a DU or CU-UP), in accordance with defined data management criteria.

The discard manager component can determine whether a congestion condition exists with regard to a DRB(s) associated with a DU (e.g., for each of one or more DUs) or a CU-UP based at least in part on congestion information associated with the DRB(s). In some embodiments, if there is congestion in a DRB(s) associated with the DU, the DU can communicate congestion information (e.g., a congestion indicator) to the discard manager component. In certain embodiments, the congestion indicator can be included in a header of a downlink DDS frame associated with the congested DRB(s), and the DU can communicate the downlink DDS frame, comprising the congestion indicator, to the CU-UP (e.g., to the discard manager component of or associated with the CU-UP). In certain other embodiments, if the congestion is in the CU-UP, the discard manager component can receive the congestion information from a component of the CU-UP and/or can otherwise detect the congestion condition in the CU-UP, wherein, if there is congestion in the CU-UP, the congestion condition can be associated with any (e.g., all or at least some) of the DRBs that can be associated with the CU-UP and one or more associated DUs.

In response to detecting that there is a congestion condition associated with a DRB(s) (e.g., and transitioning the discard manager component from an inactive state to an active state after determining that the congestion condition has continued for at least a first defined amount of time, as set using a first timer (e.g., a congestion detection wait timer)), the discard manager component can determine a PDU set present (e.g., stored) in a buffer component (e.g., buffer memory) of the CU-UP and associated with the congested DRB(s) that has a highest PSI value (e.g., a lowest priority level), set that highest PSI value as a threshold PSI value for discarding of certain data packets of PDU sets associated with the congested DRB(s), and discard, from the buffer component, any data packet(s) of any PDU set(s) associated with the congested DRB(s) that is determined to satisfy the threshold PSI value. If the congestion associated with the DRB(s) persists (e.g., continues on unresolved, even after discarding data packets of PDU sets that satisfy the threshold PSI value), the discard manager component can adjust (e.g., iteratively adjust) the threshold PSI value (or a previous threshold PSI value) as a function of a current highest PSI value, the threshold PSI value (or the previous threshold PSI value), and a defined adjustment value (e.g., a defined step size), wherein the current highest PSI value can be the highest PSI value (e.g., lowest priority level) associated with a PDU set present in the buffer component and associated with a congested DRB(s). For example, the discard manager component can adjust the threshold PSI value to an adjusted threshold PSI value that can be equal to the minimum of the current highest PSI value and a total value equal to the threshold PSI value minus the defined adjustment value (e.g., min (current highest PSI value, (threshold PSI value-defined adjustment value). The discard manager component can discard, from the buffer component, any data packet(s) of any PDU set(s) associated with the congested DRB(s) that is determined to satisfy the adjusted threshold PSI value. If the discard manager component determines that the threshold PSI value is to be adjusted (e.g., due to the congestion condition not being resolved by the end of an update time period), the discard manager component can iteratively adjust the threshold PSI value one or more times (e.g., over one or more update time periods for updating of the threshold PSI value) until the congestion condition associated with the DRB(s) is resolved.

In some embodiments, if the discard manager component receives subsequent congestion information that the congestion condition associated with the DRB(s) no longer exists (e.g., a not-congested indicator or other information indicating the congestion condition no longer exists), the discard manager component can transition from the active state to a deactivating state, wherein the discard manager component can discontinue discarding of data packets of PDU sets associated with the congested DRB(s), and can set a second timer for a second defined amount of time (e.g., to see if the congestion condition has been fully or completely resolved, or, instead, was only momentarily resolved and occurs again). If, before the second defined amount of time elapses, the congestion condition associated with the DRB(s) is again detected, the discard manager component can transition from the deactivating state back to the active state, and the discard manager component can resume discarding, from the buffer component, any data packet(s) of any PDU set(s) associated with the congested DRB(s) that is determined to satisfy the applicable threshold PSI value (e.g., threshold PSI value or adjusted threshold PSI value) and/or can iteratively adjust the threshold PSI value or previously adjusted threshold PSI value, such as described herein. If, instead, the second defined amount of time elapses without the congestion condition associated with the DRB(s) being detected, the discard manager component can transition from the deactivating state to the inactive state, wherein there can be no discarding of data packets of PDU sets (e.g., at least no discarding of data packets of PDU sets due to a congestion condition associated with a DRB), and the discard manager component can continue to monitor the RAN (e.g., the DU(s) and CU-UP of the RAN) for the occurrence of congestion conditions.

The disclosed subject matter, by employing the discard manager component and the techniques described herein, can desirably (e.g., suitably, efficiently, enhancedly, or optimally) manage and perform discarding of certain data packets of certain PDU sets when there is congestion in the DU or CU-UP (e.g., congestion associated with one or more DRBs associated therewith). The disclosed subject matter, by employing discard manager component and the techniques described herein, can thereby desirably (e.g., suitably, enhancedly, efficiently, or optimally) mitigate (e.g., reduce or minimize) undesired increases in the amount of data stored in the buffer, mitigate undesired delay associated with communication of data, and mitigate undesired discarding of data packets of PDU sets and SDUs due to congestion in the DU or CU-UP.

These and other aspects and embodiments of the disclosed subject matter will now be described with respect to the drawings.

Referring now to the drawings, FIG. 1 illustrates a block diagram of a non-limiting example system 100 that can desirably (e.g., automatically, dynamically, suitably, reliably, efficiently, enhancedly, and/or optimally) manage and mitigate discarding of data, such as data packets of PDU sets (e.g., due to a congestion condition associated with a DRB(s) associated with a DU or CU-UP), and manage and mitigate congestion in a RAN (e.g., manage and mitigate congestion in the DU or CU-UP of the RAN) of a communication network, in accordance with various aspects and embodiments of the disclosed subject matter. The system 100 can comprise a communication network 102 that can comprise a core network 104 and one or more radio access networks (RANs), such as RAN 106, that can be associated with (e.g., communicatively connected to) the core network 104. Each RAN (e.g., RAN 106) can comprise one or more base stations, such as, for example, base station 108, that each can comprise one or more cells, such as cell 110, cell 112, and/or cell 114. In some embodiments, cells 110, 112, and 114 can be associated with the base station 108, and/or other cells can be associated with another base station of the RAN 106.

The core network 104, the one or more RANs (e.g., RAN 106), the one or more base stations (e.g., base station 108), and the one or more cells (e.g., cells 110, 112, and/or 114) can facilitate (e.g., enable) wireless communication of data (e.g., voice or other audio data, video data, textual data, or other data) between devices (e.g., communication devices or UEs), such as devices associated with the core network 104, via the one or more RANs, one or more base stations, and one or more cells, and other devices associated with the core network 104 or, more generally, the communication network 102 (e.g., a device, such as a server or computer, can be connected to the communication network 102 via a wireline connection or via a network other than the core network 104).

The devices can comprise, for example, devices 116 and/or 118. A device (e.g., 116 or 118) can be, for example, a wireless, mobile, or smart phone, a computer, a laptop computer, a server, an electronic pad or tablet, a virtual assistant (VA) device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device (e.g., 116 or 118) can be associated with (e.g., communicatively connected to) the communication network 102 via a communication connection and channel, which can include a wireless or wireline communication connection and channel.

In accordance with various embodiments, the core network 104 can comprise various network components that can facilitate wireless communication of data. In some embodiments, the RAN 106 can be a 5G or other NR RAN (e.g., gNB or other NR-type or xG RAN, wherein x can be a number greater than 5), and/or the base station(s) (e.g., base station 108) can be a 5G or other NR base station (e.g., gNB or other NR-type or xG base station, wherein x can be a number greater than 5). In certain embodiments, the core network 104 can comprise a UPF node, an access and mobility management function (AMF) node, and/or other network functions (not shown in FIG. 1 for reasons of brevity and clarity). The UPF node can connect to or interface with the one or more RANs (e.g., RAN 106) and the one or more base stations (e.g., base station 108), can be an interconnect point between the core network 104 and a data network (DN), can provide or facilitate providing a PDU session anchor point for providing mobility associated with radio access technologies (RATs), can provide or facilitate providing data packet routing or forwarding, and/or can perform or manage other functions. The AMF node can be a control plane function that can manage registration and deregistration of devices (e.g., devices 116 and/or 118) with the core network 104, manage connections of devices with the core network 104, manage mobility associated with devices (e.g., maintain knowledge of locations of devices, update locations of devices), and/or manage or perform other functions. In accordance with various other embodiments, the RAN(s) (e.g., RAN 106) and/or the base station(s) (e.g., base station 108) can be a 4th generation (4G) long term evolution (LTE) RAN or base station, or the RAN or base station can comprise 4G LTE technology and functions, and 5G or other NR-type or xG technology and functions.

The communication network 102, more generally, or the core network 104 can comprise various other network equipment (e.g., routers, gateways, transceivers, switches, access points, network functions, processor components, data stores, or other devices or network nodes) that facilitate (e.g., enable) communication of information between respective items of network equipment of the communication network 102, and/or communication of information between the one or more devices (e.g., devices 116 and/or 118) and the communication network 102. The communication network 102, including the core network 104, can provide or facilitate wireless or wireline communication connections and channels between the one or more devices (e.g., devices 116 and/or 118), and/or respectively associated services or applications, and the communication network 102. For reasons of brevity or clarity, some of the various network equipment, components, functions, or devices of the communication network may not be explicitly shown or described herein.

At various times, the respective devices (e.g., devices 116 and/or 118) can utilize respective services. The services can comprise or relate to, for example, voice service (e.g., conversational voice services or other voice services), video streaming service, conversational video service, buffered video service, audio streaming service, other type of streaming service, text or messaging service, data service, control message service (e.g., control message service relating to control of communication network functions and operations), signaling service, real time gaming service, interactive gaming service, transmission control protocol (TCP) service, control message service relating to automated or semi-automated vehicles or motorized devices, law enforcement-related service, medical-related service, emergency-related service, military-related service, background traffic service, or other desired types of service. In some embodiments, a service can be an XR service or other type of service that can involve or relate to communication of data bursts comprising PDU sets.

In some embodiments, the RAN 106 can comprise various RAN nodes, including distributed units (DUs), such as DU 120 associated with one or more cells (e.g., cell 110, cell 112, and cell 114, as shown in FIG. 1), one or more central units (CUs), such as CU 122, that can be associated with (e.g., communicatively connected to) the respective DUs (e.g., DU 120), and/or one or more radio units (RUs), such as RU 124, that can be associated with the CU(s) 122, and/or other components. In some embodiments, a base station(s) (e.g., base stations 108) of the RAN 106, which also can be referred to as a gNodeB (gNB), can be logically divided into several components, which can allow for flexibility of deployment. For instance, the base station (e.g., base station 108) can comprise a DU(s) 120, which also can be referred to as gNB-DU, the CU 122, and the RU 124, which also can be referred to as gNB-RU. The CU 122 can comprise a CU-CP 126, which also can be referred to as gNB-CU-CP, and a CU-UP 128, which also can be referred to as gNB-CU-UP, and can be associated with (e.g., communicatively connected to) the CU-CP 126. The DU 120 can be associated with (e.g., communicatively connected to) the CU 122. The CU 122 also can be associated with (e.g., communicatively connected to) the RU 124.

As disclosed, there can be instances where there can be congestion in the DU 120 or CU-UP 128. For instance, one or more DRBs associated with the DU 120 or CU-UP 128 can be experiencing an undesirable level of congestion. With regard to congestion in the DU 120, the congestion may impact (e.g., negatively impact) the entire DU 120 or may only impact one or more specific cells (e.g., cell 110 and/or cell 112) and/or DRBs of the DU 120, but not other cells (e.g., cell 114) and/or DRBs of the DU 120. As disclosed, some existing techniques for handling congestion associated with a base station can be deficient in a number of ways, as the use of such existing techniques can lead to or result in an undesirably (e.g., unwanted, unacceptable, inefficient, or suboptimal) increased buffer (e.g., an increase in the amount of data stored in the buffer of the CU-UP) and increased delay, which can lead to or result in undesirable triggering of PDCP SDU discarding (e.g., due to a PDCP discard timer elapsing or PDCP buffer threshold-based discarding of data from the buffer). For a DRB that is carrying data traffic for XR services, such handling of data traffic using such existing techniques can lead to or result in undesirable (e.g., unwanted, unacceptable, inefficient, suboptimal, or otherwise undesired) discarding of a PDCP SDU(s) belonging to a PDU set(s) of higher importance (e.g., a data packet(s) of a PDU set(s) associated with a lowest or lower PSI value (e.g., associated with a highest or higher priority level) may be undesirably discarded.

The disclosed subject matter can overcome these deficiencies and other problems of existing techniques. To that end, the system 100 can comprise a discard manager component 130 (DISCARD MGR) that can desirably (e.g., automatically, dynamically, suitably, reliably, efficiently, enhancedly, and/or optimally) manage and mitigate congestion in one or more RANs (e.g., RAN 106) of the communication network 102, and manage and mitigate the discarding of data (e.g., data packets of PDU sets) when there is congestion in the RAN(s) (e.g., congestion in the DU 120 and/or CU-UP 128 of RAN 106), in accordance with the defined data management criteria. In some embodiments, the discard manager component 130 can be part of the CU-UP 128 (as depicted), such as described herein. In other embodiments, the discard manager component 130 can be a stand-alone component or part of another component, such as a controller (e.g., a RAN intelligent controller (RIC) or other type of controller), associated with the RAN(s)), and/or can be located or situated elsewhere in or associated with the communication network 102, wherein the discard manager component 130 can be associated with (e.g., communicatively connected to) the DU 120 and/or CU-UP 128. In certain embodiments, the discard manager component 130 can be employed when certain services, such as an XR service or other service that can involve communication of data bursts comprising PDU sets or similar types of data, are being utilized (e.g., by a device(s) 116 and/or 118 associated with the RAN 106), although, in certain other embodiments, if and as desired, the discard manager component 130 can be employed with regard to any type of service that is being utilized (e.g., by a device(s) 116 and/or 118 associated with the RAN 106).

In some embodiments, when there is congestion in the DU 120, the discard manager component 130 can determine that there is congestion in the DU 120 based at least in part on a congestion indicator (e.g., in a header of a downlink DDS frame) that the discard manager component 130 can receive from the DU 120, wherein the congestion indicator can indicate that there is congestion in one or more DRBs associated with the DU 120. When there is congestion in the CU-UP 128, the discard manager component 130 can detect the congestion in the CU-UP 128 or can receive congestion information from another component of the CU-UP 128 that can indicate that there is congestion in the CU-UP 128.

In response to determining that the congestion condition exists, from a group of PDU sets present (e.g., stored) in a buffer component (e.g., PDCP buffer memory) of the CU-UP 128 and associated with one or more DRBs that are experiencing the congestion condition, the discard manager component 130 can determine a data packet of a PDU set to discard based at least in part on a priority level (e.g., PSI value) associated with the PDU set as compared to other priority levels (e.g., other PSI values) of other PDU sets of the group of PDU sets, wherein the PDU set can be associated with a DRB of the one or more DRBs that are experiencing the congestion condition. For example, the discard manager component 130 can determine that the data packet(s) of the PDU set(s) associated with a congested DRB(s) and having the lowest priority level (e.g., the highest PSI level) can be discarded from the buffer component of the CU-UP 128. The discard manager component 130 also can set that lowest priority level as a threshold priority level that can be used to determine subsequent discarding of any data packets of PDU sets, associated with a congested DRB(s) and present in the buffer component, that are determined to satisfy the threshold priority level, if and until the threshold priority level is adjusted or updated to an adjusted threshold priority level during a next update time period (e.g., if the congestion condition in the congested DRBs has not been resolved) or the congestion condition in the DRBs is determined to be resolved, in accordance with the defined data management criteria, such as described herein. The discard manager component 130 can continue to monitor congestion in the DU 120 and/or CU-UP 128 (e.g., in the DRBs associated therewith), and, during one or more update time periods, if the congestion condition associated with the DRBs is determined to not be resolved, the discard manager component 130 can iteratively update or adjust the threshold priority level (or a previously adjusted threshold priority level) to an adjusted threshold priority level, and can discard any data packets of any PDU sets associated with the congested DRBs and present in the buffer component that are determined to satisfy the applicable adjusted threshold priority level, to facilitate mitigating (e.g., reducing, minimizing, or eliminating) the congestion condition, while also mitigating undesirable (e.g., unwanted, unacceptable, or suboptimal) discarding of data packets of PDU sets, in accordance with the defined data management criteria, such as described herein.

Figure 2:
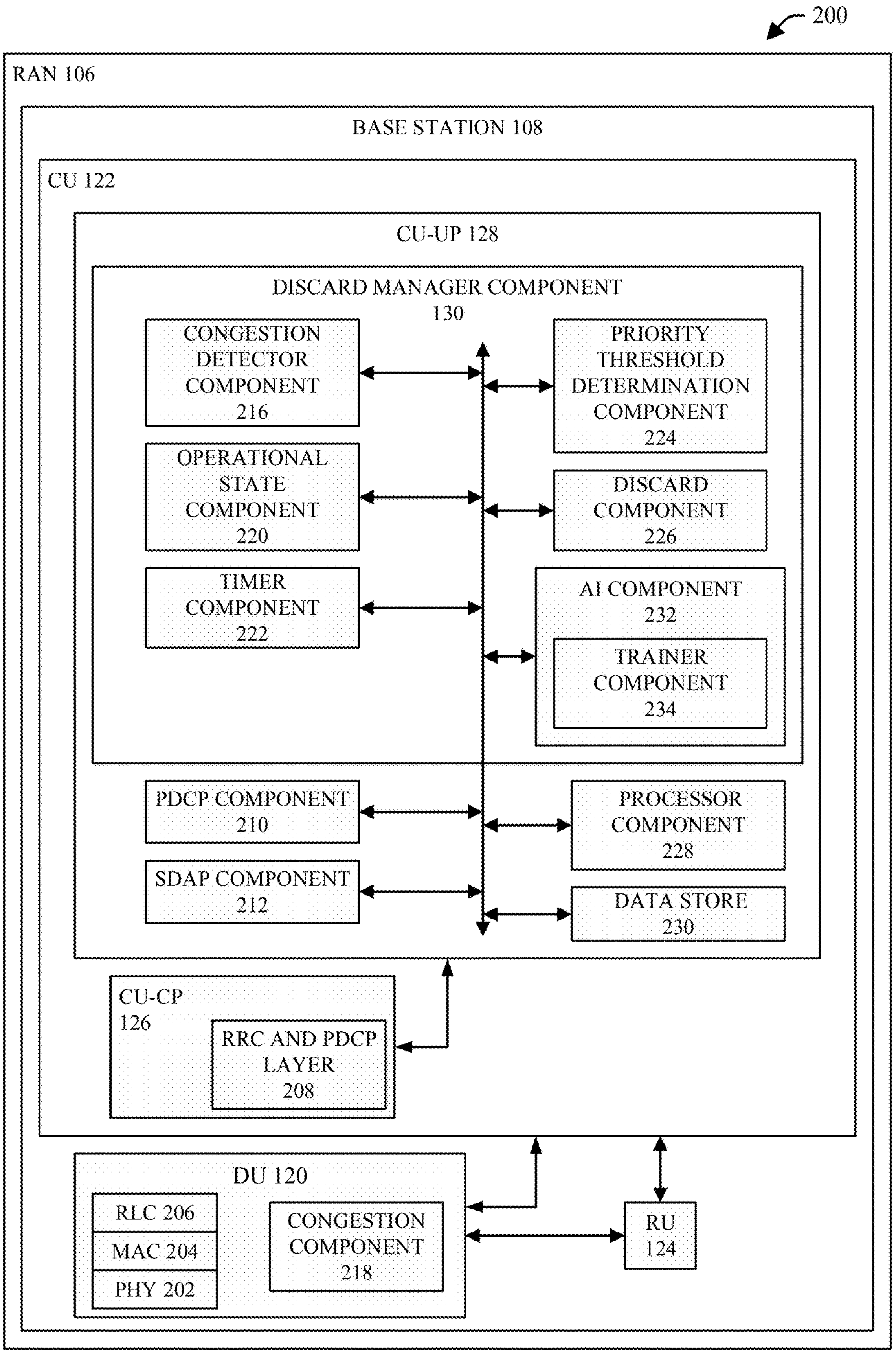
FIG. 2 depicts a block diagram of non-limiting example system that can comprise the RAN, which can comprise the discard manager component (e.g., in or associated with a central unit (CU)-user plane (UP)), in accordance with various aspects and embodiments of the disclosed subject matter.

Referring to FIG. 2 (along with FIG. 1), FIG. 2 depicts a block diagram of non-limiting example system 200 that can comprise the RAN 106, which can comprise the discard manager component 130 (e.g., in or associated with the CU-UP 128), in accordance with various aspects and embodiments of the disclosed subject matter. In some embodiments, the system 200 can be part of the system 100 depicted in FIG. 1. The RAN 106 can comprise the base station 108 that can comprise the DU 120, the CU 122, and the RU 124. The CU 122 can comprise the CU-CP 126 and the CU-UP 128. The CU-UP 128 can comprise or be associated with the discard manager component 130.

In some embodiments, the RAN 106 can be an open-RAN (O-RAN) that can be part of an O-RAN architecture and environment (e.g., the communication network 102 can employ an O-RAN architecture and environment). In certain embodiments, the RAN 106 can be a cloud-based or centralized RAN (C-RAN) that can be part of a cloud or centralized RAN (C-RAN), or a virtual RAN (vRAN) that can be part of a vRAN architecture and environment (e.g., the communication network 102 can employ a C-RAN or vRAN architecture and environment). In still other embodiments, the RAN 106 may not be an O-RAN, C-RAN, or vRAN.

The DU 120 can be a logical node that can host or handle baseband (e.g., PHY 202) and layer 2 (L2) (e.g., MAC layer 204 and RLC layer 206) functionality associated with the base station. The CU-CP 126 (also referred to as a CU-CP node) can be a logical node that can host or handle layer 3 (L3) (e.g., radio resource control (RRC) and PDCP layer 208) control plane functionality associated with the base station 108. The CU-UP 128 (also referred to as a CU-UP node) can be a logical node that can host or handle data traffic between the core network 104 (e.g., 5G core network) and the DUs (e.g., 120) to which the CU-UP 128 is connected. In some embodiments, the CU-UP 128 can comprise a PDCP component 210 that can perform PDCP functions and an SDAP component 212 that can perform SDAP functions. The RU 124 can be or can comprise a logical node that can host a lower PHY layer and radio frequency (RF) processing, where signals (e.g., RF signals) can be transmitted, received, amplified, digitized, or otherwise processed, to facilitate communication of information (e.g., signals comprising information) between the RAN 106 and other devices (e.g., devices 116 and/or 118) or components (e.g., components or functions of the core network 104 or communication network 102).

In some embodiments, the CU-UP 128 also can comprise a buffer component 214 (e.g., PDCP buffer) that can be or can comprise buffer memory for storing (e.g., temporarily storing) data, such as PDU sets or other desired data, associated with a service or application, until the CU-UP 128 communicates (e.g., via a downlink channel) the data to a desired device(s) (e.g., device 116 and/or device 118), via the DU 120 and associated cell(s) (e.g., cell 110, cell 112, and/or cell 114). For instance, when the device 116 and/or the device 118 are utilizing services, such as, for example, an XR service or other service that can involve communication of data bursts comprising PDU sets or similar types of data, downlink data, such as PDU sets, can be stored in the buffer component 214 until ready for communication to the device 116 and/or device 118. As disclosed, respective PDU sets can be associated with respective PSI values (e.g., respective priority levels). If there is congestion in the DU 120 or CU-UP 128, this may result in some of the PDU sets in the buffer component 214 having to be discarded. While this may not be a significant problem with regard to lower priority PDU sets (e.g., data packets of PDU sets associated with higher PSI values) if discarded, it can pose a significant problem if higher priority PDU sets (e.g., data packets of PDU sets associated with lower PSI values) are discarded from the buffer component 214, as that can undesirably and significantly impact QoS and performance of the service, and the quality of experience (QoE) of the user (e.g., via the device 116 or 118) of the service.

The discard manager component 130 can address such issues, as the discard manager component 130 can desirably manage and mitigate undesirable discarding of data packets of PDU sets, and also can manage and mitigate undesirable congestion in the DU 120 and/or CU-UP 128, such as described herein. In some embodiments, the discard manager component 130 can comprise a congestion detector component 216 that can monitor a group of DRBs, comprising one or more DRBs, associated with the DU 120 and/or the CU-UP 128 to facilitate determining whether a congestion condition exists for one or more of the DRBs. The congestion detector component 216 can detect or determine whether the DU 120, the CU-UP 128, and/or the one or more DRBs associated therewith is or are experiencing a congestion condition based at least in part on congestion information (e.g., congestion-related information or congestion indicator information) that can be received from the DU 120 and/or CU-UP 128 (e.g., received from another component of the CU-UP 128).

In certain embodiments, with regard to the DU 120, to facilitate detection of a congestion condition associated with the DU 120 and/or one or more DRBs associated therewith, the DU 120 can comprise a congestion component 218 that can generate a congestion indicator that can indicate whether the DU 120 and/or one or more associated DRBs are experiencing a congestion condition. For example, the congestion component 218 can set the congestion indicator to a first congestion indicator value (e.g., 0 or other desired first congestion indicator value) that can indicate there is no congestion condition associated with the DU 120 and/or one or more associated DRBs, or can set the congestion indicator to a second congestion indicator value (e.g., 1 or other desired second congestion indicator value) that can indicate there is a congestion condition associated with the DU 120 and/or one or more associated DRBs. In some embodiments, the congestion component 218 can include or incorporate the congestion indicator, set to the applicable or appropriate congestion indicator value, in a field in a header of a downlink DDS frame, and the DU 120 can communicate the downlink DDS frame, comprising the congestion indicator, to the CU-UP 128. The congestion detector component 216 can analyze the downlink DDS frame, including the congestion indicator value of the congestion indicator, to determine whether the DU 120 and/or one or more associated DRBs are experiencing a congestion condition based at least in part on the congestion indicator value.

Figure 3:
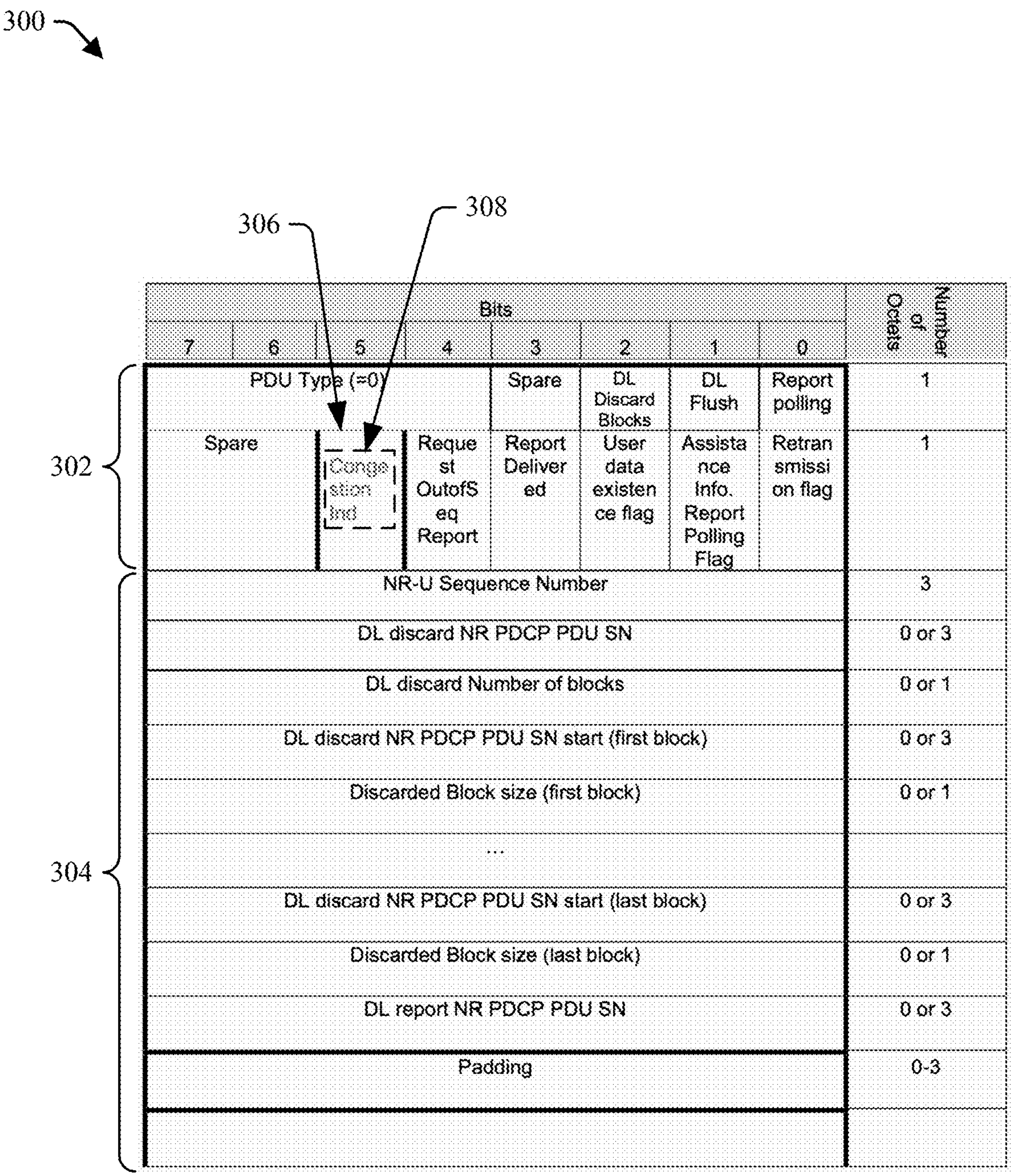
FIG. 3 depicts a diagram of non-limiting example downlink data delivery status frame that can comprise a header field for a congestion indicator that can indicate whether a distributed unit (DU) and/or a data resource bearer(s) (DRB(s)) associated therewith is experiencing a congestion condition, in accordance with various aspects and embodiments of the disclosed subject matter.

Referring briefly to FIG. 3 (along with FIGS. 1 and 2), FIG. 3 depicts a diagram of non-limiting example downlink DDS frame 300 that can comprise a header field for a congestion indicator that can indicate whether the DU 120 and/or a DRB(s) associated therewith is experiencing a congestion condition, in accordance with various aspects and embodiments of the disclosed subject matter. The downlink DDS frame 300 can comprise a header section 302 and a data payload section 304 that can comprise various respective fields that can be in a desired defined frame format (e.g., defined downlink DDS frame format), in accordance with an applicable protocol (e.g., an applicable NR user plane protocol and/or other applicable protocol).

The data payload section 304 can comprise various fields, such as respective fields regarding or relating to NR-U sequence number, downlink (DL) discard NR PDCP PDU sequence number (SN), DL discard number of blocks, and/or other types of fields, such as depicted in the example downlink DDS frame 300. The header section 302 can comprise various fields, such as respective fields regarding or relating to request out of sequence report (RequestOutofSeqReport), report delivered (ReportDelivered), user data existence flag, assistance information (info.) report polling flag, retransmission flag, and/or other types of fields, such as depicted in the example downlink DDS frame 300. In some embodiments, in the header section 302, the downlink DDS frame 300 can be structured or formatted to use one (or more than one) of the spare bits in the header section as a congestion status field 306 where a congestion indicator 308 (Congestion Ind) having an desired (e.g., applicable) congestion indicator value can be inserted or stored, wherein the congestion indicator value of the congestion indicator 308 can indicate or specify a congestion status of the DU 120 (e.g., can indicate or specify whether the DU 120 and/or one or more of the associated DRBs are experiencing a congestion condition). If the congestion indicator 308 is set (e.g., by the congestion component 218) to a first congestion indicator value (e.g., 0 or other desired first congestion indicator value), this can indicate there is no congestion condition associated with the DU 120 and/or one or more associated DRBs. If the congestion indicator 308 is set to a second congestion indicator value (e.g., 1 or other desired second congestion indicator value), this can indicate that there is a congestion condition associated with the DU 120 and/or one or more associated DRBs.

If the congestion detector component 216 receives a congestion indicator (e.g., 308) from the DU 120 that indicates there is a congestion condition associated with the DU 120 and/or associated DRB(s), the congestion detector component 216 can mark, indicate, or identify the DRB(s) as being congested (e.g., as experiencing the congestion condition). If, instead, the congestion detector component 216 receives a congestion indicator (e.g., 308) from the DU 120 that indicates there is no congestion condition associated with the DU 120 and/or associated DRB(s), the congestion detector component 216 can mark, indicate, or identify the DU 120 and/or associated DRB(s) as not being congested.

In certain embodiments, depending in part on whether there has been a congestion condition detected with regard to the DU 120, CU-UP 128, and/or one or more DRBs associated therewith, and/or how long the congestion condition has existed or ceased to exist, the discard manager component 130 can be in or transition to a desired operational state of a group of operational states. In that regard, the discard manager component 130 can comprise an operational state component 220 that can place or transition the discard manager component 130 in or to a desired operational state, such as an active state, deactivating state, or inactive state, based at least in part on a congestion status associated with the DU 120, CU-UP 128, and/or one or more DRBs associated therewith, and a length of time of the congestion status, such as described herein.

Figure 4:
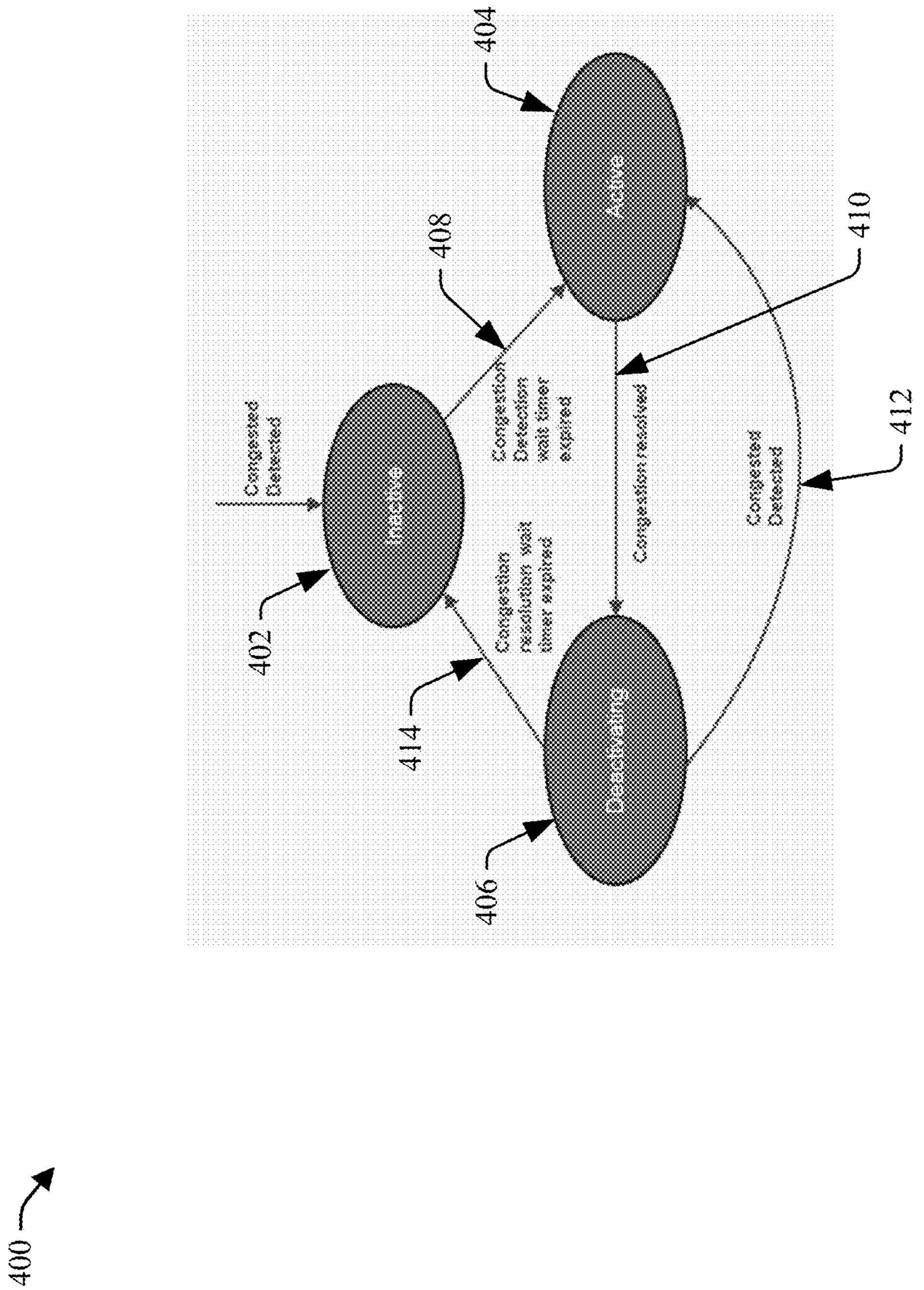
FIG. 4 illustrates a diagram of non-limiting example operational state diagram that can indicate various state transitions that the discard manager component can implement to facilitate managing and mitigating discarding of data packets of PDU sets, and managing and mitigating a congestion condition, when there is a congestion condition associated with a DU, a CU-UP, and/or one or more DRBs associated therewith, in accordance with various aspects and embodiments of the disclosed subject matter.
Figure 5:
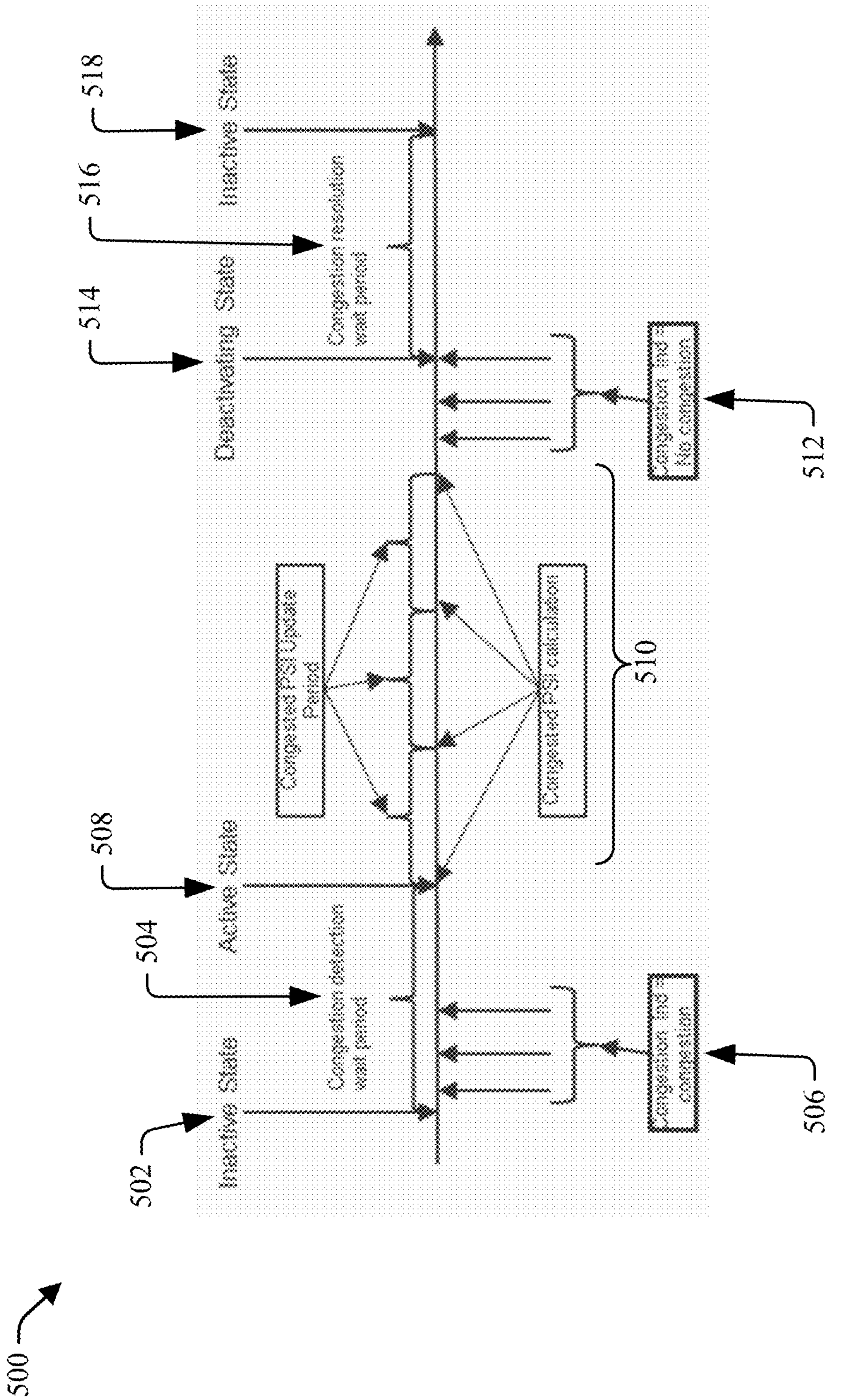
FIG. 5 depicts a diagram of non-limiting example time diagram that can indicate respective timing of respective conditions or operations relating to detecting a congestion condition, managing and mitigating discarding of data packets of PDU sets, and managing and mitigating a congestion condition, in accordance with various aspects and embodiments of the disclosed subject matter.

Referring to FIGS. 4 and 5 (along with FIGS. 1 and 2), FIG. 4 illustrates a diagram of non-limiting example operational state diagram 400 that can indicate various state transitions that the discard manager component 130 can implement to facilitate managing and mitigating discarding of data packets of PDU sets, and managing and mitigating a congestion condition, when there is a congestion condition associated with a DU, a CU-UP, and/or one or more DRBs associated therewith, and FIG. 5 depicts a diagram of non-limiting example time diagram 500 that can indicate respective timing of respective conditions or operations relating to detecting a congestion condition, managing and mitigating discarding of data packets of PDU sets, and managing and mitigating a congestion condition, in accordance with various aspects and embodiments of the disclosed subject matter. The example operational state diagram 400 can comprise, for example, an inactive state 402, an active state 404, and a deactivating state 406.

Generally, when there is no congestion condition detected with regard to the DU 120, CU-UP 128, and/or one or more DRBs associated therewith, the operational state component 220 can have the discard manager component 130 in the inactive state 402, as indicated in the operational state diagram 400 of FIG. 4, and as indicated at reference numeral 502 of the example time diagram 500 of FIG. 5. While in the inactive state 402, the discard manager component 130 can wait for an indication that there is a congestion condition associated with the DU 120, CU-UP 128, and/or one or more DRBs associated therewith, and can manage (e.g., control) PDU sets such that the discard manager component 130 can determine that no PDU sets (e.g., no data packets of PDU sets) can be discarded from the buffer component 214 due to congestion (e.g., since there is no congestion condition detected).

When the congestion detector component 216 detects that there is a congestion condition associated with one or more DRBs (e.g., if and when the congestion detector component 216 receives a congestion indicator from the DU 120 that indicates there is a congestion condition associated with the DU 120 and/or associated DRB(s)), the discard manager component 130, employing a timer component 222, can initiate or set a first timer (e.g., a congestion detection wait timer), which can be set for a first defined amount of time (e.g., a congestion detection wait time period), for the discard manager component 130 to wait after detection of the congestion condition before the operational state component 220 transitions the discard manager component 130 from the inactive state 402 to the active state 404, as indicated at reference numeral 504 of the example time diagram 500 of FIG. 5. In some embodiments, the first defined amount of time can range from 100 milliseconds (ms) to 500 ms, although, in other embodiments, the first defined amount of time can be less than 100 ms or more than 500 ms. During this congestion detection wait time period, the congestion detector component 216 can receive one or more congestion indicators from the DU 120 (or other congestion information) that can indicate whether the congestion condition continues to exist. If, prior to the expiration of the first timer (e.g., if, prior to the first defined amount of time elapsing), the discard manager component 130 determines that the congestion condition no longer exists (e.g., if the congestion detector component 216 receives a subsequent congestion indicator that indicates that the congestion condition associated with the one or more DRBs and/or DU 120 has been resolved), the operational state component 220 can maintain the discard manager component 130 in the inactive state 402, and the timer component 222 can discontinue or terminate the first timer.

If, instead, during the congestion detection wait period, the congestion detector component 216 receives one or more congestion indicators from the DU 120 (or other congestion information) that indicate the congestion condition associated with the one or more DRBs and/or DU 120, and/or the CU-UP 128, continues to exist (e.g., as indicated at reference numeral 506 of the example time diagram 500), and the first timer expires, the discard manager component 130 can determine that the congestion condition is ongoing, the operational state component 220 can transition the discard manager component 130 from the inactive state 402 to the active state 404, as indicated at reference numeral 408 of the operational state diagram 400 of FIG. 4, and as indicated at reference numeral 508 of the example time diagram 500 of FIG. 5.

While in the active state 404, the discard manager component 130 can perform one or more congested PSI calculations, including an initial congested PSI calculation when transitioned to the active state 404, and/or one or more updated congested PSI calculations at the end of one or more congested PSI update periods (e.g., if the congestion condition is determined to not have been resolved), as indicated at reference numeral 510 of the example time diagram 500 of FIG. 5, such as described herein. The amount of time of a congested PSI update period can be as desired, and typically can range on the order of hundreds of milliseconds, such as a range of 100 ms to 500 ms, although, in certain embodiments, the update period can be less than 100 ms or longer than 500 ms. In some embodiments, the discard manager component 130 or a user can modify or adapt the amount of time of an update period to facilitate enhancing performance of the discard manager component 130, in accordance with the defined data management criteria. In certain other embodiments, each update period can span the same amount (e.g., length) of time, although, in still other embodiments, respective update periods can span respective (e.g., unique or different) amounts of time.

Also, while in the active state 404, the discard manager component 130 can discard, from the buffer component 214, any data packets of any PDU sets that are associated with a PSI value that is determined to satisfy an applicable threshold PSI value (e.g., an applicable threshold priority level) and are associated with a congested DRB, wherein the applicable threshold PSI value (e.g., initial threshold PSI value or subsequent updated threshold PSI value) can be determined based at least in part on the initial or updated congested PSI calculations, such as described herein. While in the active state 404, the congestion detector component 216 can continue to monitor the DU 120 and the one or more associated DRBs (e.g., one or more congested DRBs), and/or the CU-UP 128, and can continue to receive congestion indicators from the DU 120 and/or other congestion information (e.g., from the CU-UP 128).

As depicted in the example time diagram 500, the congestion condition (e.g., associated with the DU 120 and the one or more associated DRBs, and/or the CU-UP 128) can be determined to not have been resolved for multiple update periods (e.g., due to the congestion detector component 216 continuing to receive congestion indicators (or other congestion information) that indicate the congestion condition continues to exist). In other instances, the actions of the discard manager component 130 and/or another component(s), and/or a change in circumstances associated with the service, the PDU sets, the DU 120, the CU-UP 128, or other part of the communication network 102, may result in the congestion condition being resolved before any, some, or all of the congested PSI update periods occurring and/or any, some, or all of the updated congested PSI calculations being performed by the discard manager component 130.

At some point, the congestion detector component 216 may receive a congestion indicator(s) (or other congestion information) that can indicate that the congestion condition associated with the one or more DRBs (e.g., one or more congested DRBs) and/or DU 120 (and/or CU-UP 128) has been resolved (e.g., at least momentarily or temporarily resolved), as indicated at reference numeral 512 of the example time diagram 500 of FIG. 5. In response to the discard manager component 130 determining that the congestion condition has been resolved (e.g., at least momentarily or temporarily resolved), the operational state component 220 can transition the discard manager component 130 from the active state 404 to the deactivating state 406, as indicated at reference numeral 410 of the operational state diagram 400 of FIG. 4, and as indicated at reference numeral 514 of the example time diagram 500 of FIG. 5. While in the deactivating state 406, the discard manager component 130 can discontinue (e.g., at least temporarily discontinue or suspend) discarding of data packets of PDU sets from the buffer component 214, even if those data packets of PDU sets are associated with a PSI value that satisfies the applicable threshold PSI value and are associated with a congested DRB(s).

In some embodiments, in connection with transitioning to the deactivating state 406, the timer component 222 can initiate or set a second timer (e.g., a congestion resolution wait timer), which can be set for a second defined amount of time (e.g., a congestion resolution wait time period), for the discard manager component 130 to wait after detection or determination that the congestion condition has been resolved (e.g., at least momentarily or temporarily resolved) before the operational state component 220 transitions the discard manager component 130 from the deactivating state 406 to the inactive state 402, as indicated at reference numeral 516 of the example time diagram 500 of FIG. 5. The second defined amount of time of the second timer can be same as or different from the first defined amount of time of the first timer. In some embodiments, the second defined amount of time can range from 100 ms to 500 ms, although, in other embodiments, the second defined amount of time can be less than 100 ms or more than 500 ms. During this congestion resolution wait time, the congestion detector component 216 can receive one or more congestion indicators from the DU 120 (or other congestion information) that can indicate whether the congestion condition remains resolved or whether the congestion condition has resumed again.

If, during the congestion resolution wait period, and prior to the expiration of the second timer (e.g., if, prior to the second defined amount of time elapsing), the congestion detector component 216 receives one or more congestion indicators from the DU 120 (or other congestion information) that indicate the congestion condition has resumed again, the discard manager component 130 can determine that the congestion condition has not been resolved (e.g., has not been acceptably, persistently, or completely resolved in a sustained manner or for a sustained amount of time), the operational state component 220 can transition the discard manager component 130 from the deactivating state 406 back to the active state 404, as indicated at reference numeral 412 of the operational state diagram 400 of FIG. 4. Also, the timer component 222 can discontinue or terminate the second timer. If, instead, during the congestion resolution wait period, the congestion detector component 216 receives one or more congestion indicators from the DU 120 (or other congestion information) that indicate the congestion condition remains resolved, and the second timer expires, the discard manager component 130 can determine that the congestion has been resolved (e.g., has been acceptably, persistently, or completely resolved), the operational state component 220 can transition the discard manager component 130 from the deactivating state 406 to the inactive state 402, as indicated at reference numeral 414 of the operational state diagram 400 of FIG. 4, and as indicated at reference numeral 518 of the example time diagram 500 of FIG. 5.

It is to be appreciated and understood that the example operational state diagram 400 is only one example operational state diagram, and the discard manager component 130 can employ any of a number of different operational state diagrams to facilitate managing and mitigating discarding of data packets of PDU sets, and managing and mitigating a congestion condition, when there is a congestion condition associated with a DU, a CU-UP, and/or one or more DRBs associated therewith, in accordance with the defined data management criteria. It also is to be appreciated and understood that the example time diagram 500 is only one example time diagram, and the discard manager component 130 can employ any of a number of different time diagrams to facilitate managing and mitigating discarding of data packets of PDU sets, and managing and mitigating a congestion condition, when there is a congestion condition associated with a DU, a CU-UP, and/or one or more DRBs associated therewith, in accordance with the defined data management criteria.

With further regard to when the discard manager component 130 is in the active state, and with further regard to managing discarding of data packets of PDU sets, the discard manager component 130 can comprise and employ a priority threshold determination component 224 that can determine a threshold (e.g., an initial threshold) PSI value (e.g., a congested PSI value or threshold priority level) based at least in part on a highest PSI value (e.g., a lowest priority level) associated with a PDU set that is associated with (e.g., that belongs to) a congested DRB of the one or more congested DRBs and is present (e.g., stored) in the buffer component 214. For instance, the priority threshold determination component 224 can analyze (e.g., compare) the respective PSI values associated with the respective PDU sets that are associated with any of the one or more congested DRBs and are present in the buffer component 214. Based at least in part on the results of such analysis (e.g., comparison), the priority threshold determination component 224 can determine (e.g., identify) one of the respective PSI values associated with one (or more) of the respective PDU sets that is the highest PSI value relative to (e.g., as compared to) other respective PSI values associated with other respective PDU sets, and can set that highest PSI value as the threshold PSI value.

The discard manager component 130 also can comprise a discard component 226 that can discard one or more data packets of one or more PDU sets present in the buffer component 214 (e.g., present in the buffer component 214 at the time the threshold PSI value is set or within the time period thereafter) and associated with any of the one or more congested DRBs. For instance, the discard component 226 can analyze (e.g., compare) respective PSI values of respective PDU sets, which can be present in the buffer component 214 and associated with any of the one or more congested DRBs, to the threshold PSI value. Based at least in part on the results of such analysis, the discard component 226 can determine which of the respective PSI values (if any, at the time of the analysis) associated with the respective PDU sets (e.g., associated with respective data packets of the respective PDU sets) satisfy (e.g., is at or higher than) the threshold PSI value. If the discard component 226 determines that one or more of data packets of one or more of the respective PDU sets are associated with respective PSI values that satisfy the threshold PSI value, the discard component 226 can determine that the one or more of the data packets of the one or more of those respective PDU sets associated with the respective PSI values that satisfy the threshold PSI value can be discarded from the buffer component 214, and can discard those one or more data packets of the one or more PDU sets from the buffer component 214. During the time period following the setting of the threshold PSI value, as PDU sets are inserted or added into the buffer component 214, the discard component 226 can analyze the respective PSI values associated with the respective PDU sets in the buffer component 214 to determine which of the respective PSI values associated with the respective PDU sets (e.g., respective data packets of the respective PDU sets) associated with a congested DRB(s) satisfy the threshold PSI value, and discard, from the buffer component 214, any data packets of any of those respective PDU sets associated with respective PSI values that are determined to satisfy the threshold PSI value.

Figure 6:
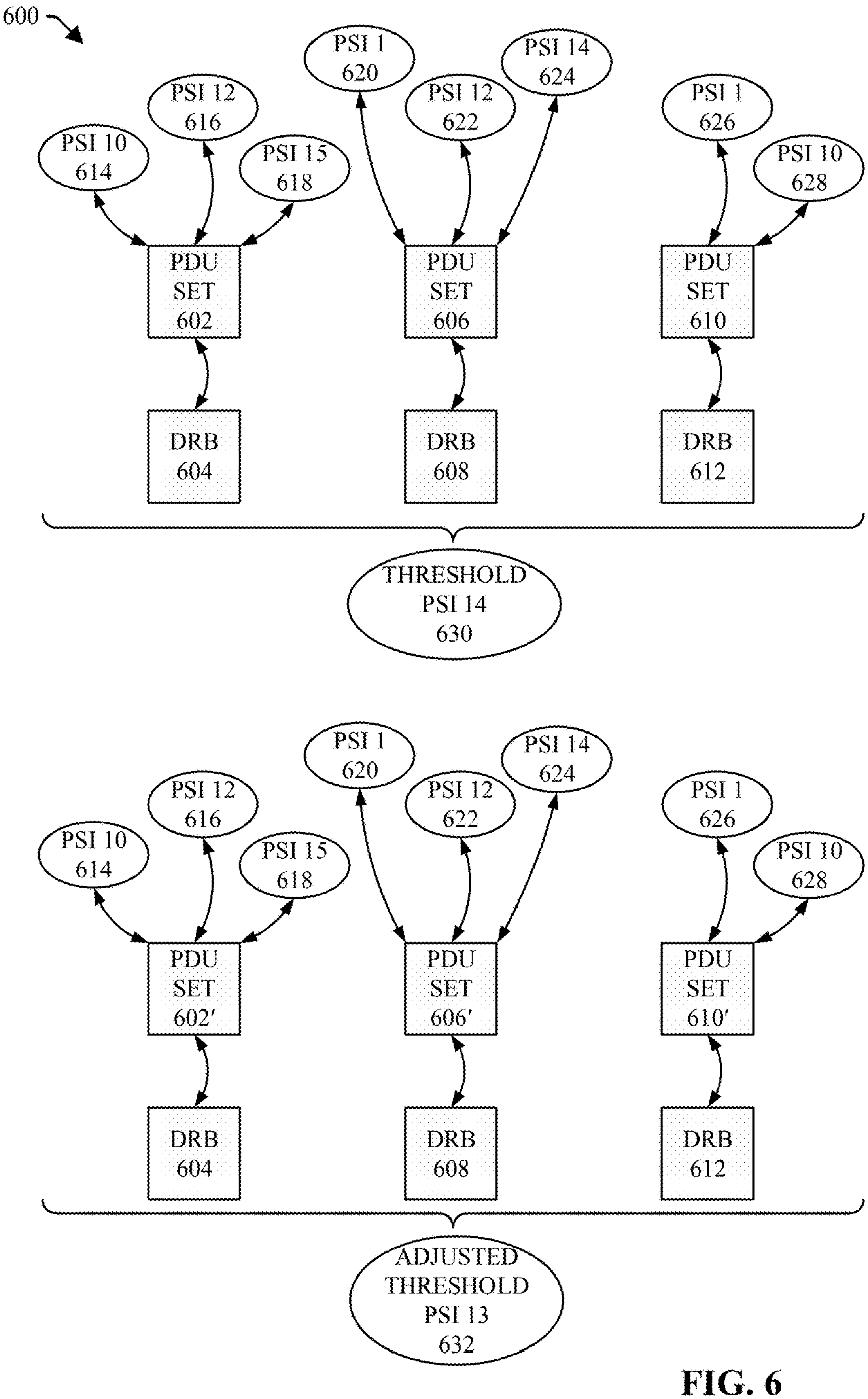
FIG. 6 depicts a diagram of non-limiting example respective PDU sets associated with respective PDU set importance (PSI) values, associated with respective DRBs, and present in a buffer component, in accordance with various aspects and embodiments of the disclosed subject matter.

As a non-limiting example, referring to FIG. 6 (along with FIGS. 1 and 2), FIG. 6 depicts a diagram of non-limiting example respective PDU sets 600 associated with respective PSI values, associated with respective DRBs (e.g., DRBs associated with the DU 120 and/or the CU-UP 128), and present in the buffer component 214, in accordance with various aspects and embodiments of the disclosed subject matter. These example respective PDU sets 600 can be present in the buffer component 214 at a time when the discard manager component 130 has transitioned from the inactive state to the active state due to a congestion condition in the DU 120 and associated with one or more DRBs.

The respective PDU sets 600 can comprise PDU set 602 associated with DRB 604 (e.g., DRB 1), PDU set 606 associated with DRB 608 (e.g., DRB 2), and PDU set 610 associated with DRB 612 (e.g., DRB 3). The PDU set 602 can be associated with PSI 10 614, PSI 12 616, and PSI 15 618 (e.g., PDU set 602 can comprise respective data packets that respectively can be associated with PSI 10 614, PSI 12 616, or PSI 15 618). The PDU set 606 can be associated with PSI 1 620, PSI 12 622, and PSI 14 624 (e.g., PDU set 606 can comprise respective data packets that respectively can be associated with PSI 1 620, PSI 12 622, or PSI 14 624). The PDU set 610 can be associated with PSI 1 626 and PSI

10 628 (e.g., PDU set 610 can comprise respective data packets that respectively can be associated with PSI 1 626 or PSI 10 628).

The congestion indicators indicating that a congestion condition exists for DRB 608 (e.g., DRB 2) and DRB 612 (e.g., DRB 3) have been received by the congestion detector component 216 (e.g., from the congestion component 218 of the DU 120). There is no congestion condition indicated for DRB 604 (e.g., DRB 1). The priority threshold determination component 224 can determine the threshold (e.g., initial threshold) PSI value (e.g., a congested PSI value or threshold priority level) based at least in part on a highest PSI value associated with a PDU set that is associated with (e.g., that belongs to) a congested DRB (e.g., DRB 608 (e.g., DRB 2) or DRB 612 (e.g., DRB 3)) and is present in the buffer component 214. Based at least in part on the results of analyzing the respective PSI values (e.g., PSI 1 620, PSI 12 622, and PSI 14 624; and PSI 1 626 and PSI 10 628) of the respective PDU sets (e.g., PDU set 606 and PDU set 610) associated with a congested DRB and present in the buffer component 214, the priority threshold determination component 224 can determine that the threshold PSI value (e.g., congested PSI value or threshold priority level) can be set as PSI 14 630 for the upcoming time period (e.g., the first time period), since PSI 14 is the highest PSI value, as compared to other PSI values associated with a congested DRB. While PSI 15 618 associated with PDU set 602 and DRB 604 (e.g., DRB 1) is higher than PSI 14 624 associated with PDU set 606 and DRB 608 (e.g., DRB 2), the priority threshold determination component 224 can determine or recognize that DRB 604 (e.g., DRB 1) is not experiencing the congestion condition and, accordingly, can disregard (e.g., can not include) PSI 15 618 (as well as PSI 10 614 and PSI 12 616) when doing the analysis to determine the highest PSI value to set as the threshold PSI value.

With the threshold PSI 14 630 being set, the discard component 226 can discard, from the buffer component 214, any data packet(s) in the PDU set 606 that is associated with a PSI value(s) (e.g., PSI 14) that is determined to satisfy the threshold PSI 14 630. Also, during this upcoming time period, the discard component 226 can utilize (e.g., apply) the threshold PSI 14 630 when analyzing any other PDU sets that are inserted into the buffer component 214 and are associated with a congested DRB (e.g., DRB 608 (e.g., DRB 2) or DRB 612 (e.g., DRB 3)). If the discard component 226 determines that any PSI values (e.g., PSI 14 or PSI 15) associated with any data packets in those other PDU sets satisfy the threshold PSI 14 630, the discard component 226 can discard any such data packets from the buffer component 214.

If the congestion condition persists, at one or more periodic times, the discard manager component 130 can update (e.g., adjust, modify, or revise) the threshold PSI value to facilitate or attempt to mitigate the congestion condition associated with the DRBs and the DU 120 (and/or CU-UP 128). In a non-limiting example scenario, with regard to a first periodic update, assume that the respective PSI values associated with respective PDU sets (e.g., PDU set 602', PDU set 606', and PDU set 610') present in the buffer component 214 at the time of the first periodic update are the same as when the discard manager component 130 transitioned to the active state and determined the threshold PSI value (e.g., threshold PSI 14 630). Also, assume that congestion indicators indicating that the congestion condition exists for DRB 608 (e.g., DRB 2) and DRB 612 (e.g., DRB 3) have been received by the congestion detector component 216 (e.g., from the congestion component 218 of the DU 120), and there is no congestion condition indicated for DRB 604 (e.g., DRB 1), as had been the case when the discard manager component 130 transitioned to the active state.

The priority threshold determination component 224 can determine the adjusted threshold (e.g., updated threshold) PSI value (e.g., an adjusted or updated congested PSI value, or adjusted or updated threshold priority level) based at least in part on (e.g., as a function of) a highest PSI value associated with a PDU set (e.g., PDU set 606' and PDU set 610') that is associated with (e.g., that belongs to) a congested DRB (e.g., DRB 608 (e.g., DRB 2) or DRB 612 (e.g., DRB 3)) and is present in the buffer component 214 at the time of the periodic update, the threshold (or previous threshold, if applicable) PSI value (e.g., congested PSIprev), and an adjustment value (e.g., congestion PSI step size). In some embodiments, the priority threshold determination component 224 can determine the adjusted threshold PSI value as being equal to the minimum of the highest PSI value associated with any of the PDU sets (e.g., PDU set 606' and PDU set 610') that are present in the buffer component and are associated with the one or more congested DRBs, and a total value of the threshold (or previous threshold, if applicable) PSI value minus the defined adjustment value (e.g., max (0, min (highest congested PSI value, (congested PSIprev-congestion PSI step size)).

Based at least in part on the results of analyzing the respective PSI values (e.g., PSI 1 620, PSI 12 622, and PSI 14 624; and PSI 1 626 and PSI 10 628) of the respective PDU sets (e.g., PDU set 606' and PDU set 610') associated with the congested DRBs and present in the buffer component 214, the priority threshold determination component 224 can determine that the highest PSI value associated with a PDU set, associated with a congested DRB and present in the buffer component 214, can be PSI 14, since, with regard to the congested DRBs (e.g., DRB 608 (e.g., DRB 2) or DRB 612 (e.g., DRB 3)), PSI 14 624 is the highest PSI value. Since the DRB 604 (e.g., DRB 1) is not experiencing the congestion condition, the priority threshold determination component 224 can accordingly disregard (e.g., can not include) PSI 15 618 (as well as PSI 10 614 and PSI 12 616) when doing the analysis to determine the highest PSI value at the time of this periodic update. The priority threshold determination component 224 can determine that the threshold PSI value is PSI 14. In some embodiments, the defined adjustment value can be 1, although, in other embodiments, the defined adjustment value can be a different value (e.g., greater than 1), in accordance with and/or as indicated or specified by the data management criteria. With these determinations, the priority threshold determination component 224 can determine (e.g., calculate) the adjusted threshold PSI value to be equal to the minimum of PSI 14 and the total value of PSI 14 minus 1 (e.g., adjusted threshold PSI value=max (0, min (14, (14-1)), which can be PSI 13. Accordingly, the priority threshold determination component 224 can set the adjusted threshold PSI value to be PSI 13 632 for the upcoming time period (e.g., the second time period (or first update time period)).

With the adjusted threshold PSI 13 632 being set, the discard component 226 can discard, from the buffer component 214, any data packet(s) in the PDU set 606 that is associated with a PSI value(s) (e.g., PSI 14) that is determined to satisfy the adjusted threshold PSI 13 632. Also, during this upcoming time period, the discard component 226 can utilize (e.g., apply) the adjusted threshold PSI 13 632 when analyzing any other PDU sets that are inserted into the buffer component 214 and are associated with a congested DRB (e.g., DRB 608 (e.g., DRB 2) or DRB 612 (e.g., DRB 3)). If the discard component 226 determines that any PSI values (e.g., PSI 13, PSI 14, or PSI 15) associated with any data packets in those other PDU sets satisfy the adjusted threshold PSI 13 632, the discard component 226 can discard any such data packets from the buffer component 214. The adjusting of the threshold PSI value during the periodic update can facilitate mitigating (e.g., reducing, minimizing, or eliminating) the congestion condition, since using the threshold PSI value for data packet discarding determinations during the previous time period did not resolve the congestion condition.

Figure 7:
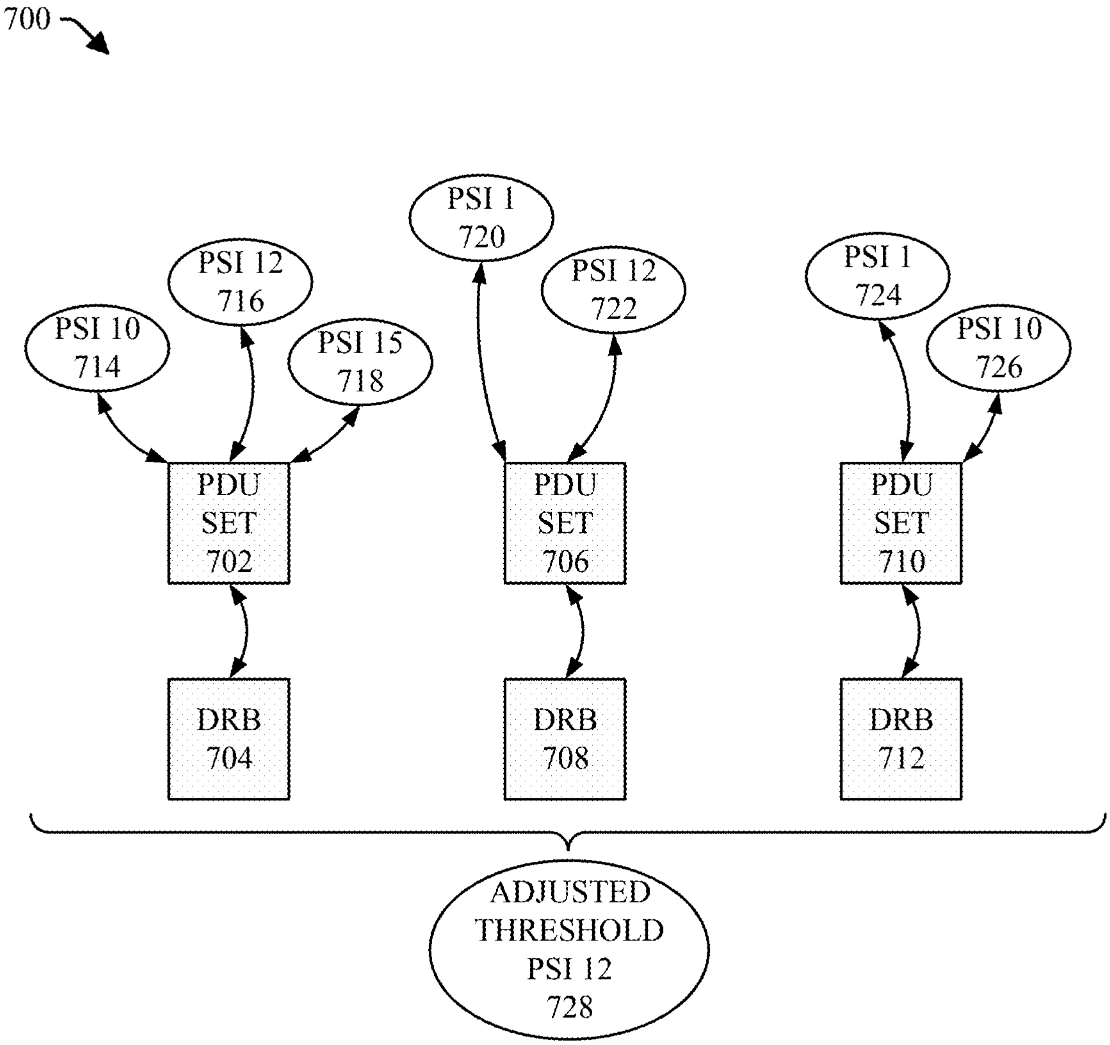
FIG. 7 presents a diagram of non-limiting example respective PDU sets associated with respective PSI values, associated with respective DRBs, and present in the buffer component, in connection with a periodic update of the threshold PSI value, in accordance with various aspects and embodiments of the disclosed subject matter.

As another non-limiting example, instead, assume that, during the periodic update, the PSI values associated with the PDU sets present in the buffer component 214 are not the same (e.g., are not all the same) as the PSI values associated with the previous PDU sets that had been in the buffer component 214 during the initial (or previous) determination of the threshold PSI value. In that regard, to illustrate, referring to FIG. 7 (along with FIGS. 1, 2, and 6), FIG. 7 presents a diagram of non-limiting example respective PDU sets 700 associated with respective PSI values, associated with respective DRBs (e.g., DRBs associated with the DU 120 and/or the CU-UP 128), and present in the buffer component 214, in connection with a periodic update of the threshold PSI value, in accordance with various aspects and embodiments of the disclosed subject matter. These example respective PDU sets 700 can be present in the buffer component 214 at a time when the discard manager component 130 has been in the active state due to a congestion condition in the DU 120 and associated with one or more DRBs, and a periodic update of the threshold PSI value can be performed.

The respective PDU sets 700 can comprise PDU set 702 associated with DRB 704 (e.g., DRB 1), PDU set 706 associated with DRB 708 (e.g., DRB 2), and PDU set 710 associated with DRB 712 (e.g., DRB 3). The PDU set 702 can be associated with PSI 10 714, PSI 12 716, and PSI 15 718 (e.g., PDU set 702 can comprise respective data packets that respectively can be associated with PSI 10 714, PSI 12 716, or PSI 15 718). The PDU set 706 can be associated with PSI 1 720 and PSI 12 722 (e.g., PDU set 706 can comprise respective data packets that respectively can be associated with PSI 1 720 or PSI 12 722). The PDU set 710 can be associated with PSI 1 724 and PSI 10 726 (e.g., PDU set 710 can comprise respective data packets that respectively can be associated with PSI 1 724 or PSI 10 726).

At the time of the periodic update, the congestion indicators indicating that a congestion condition exists for DRB 708 (e.g., DRB 2) and DRB 712 (e.g., DRB 3) have been received by the congestion detector component 216 (e.g., from the congestion component 218 of the DU 120). There is no congestion condition indicated for DRB 704 (e.g., DRB 1). Since the congestion condition is persisting, the discard manager component 130 can determine that an update to the threshold PSI value can be performed to facilitate mitigating (e.g., reducing, minimizing, or eliminating) the congestion condition, since using the threshold PSI value for data packet discarding determinations has not resolved the congestion condition.

The priority threshold determination component 224 can determine the adjusted threshold (e.g., updated threshold) PSI value based at least in part on (e.g., as a function of) a highest PSI value associated with a PDU set (e.g., PDU set 706 and PDU set 710) that is associated with (e.g., that belongs to) a congested DRB (e.g., DRB 708 (e.g., DRB 2) or DRB 712 (e.g., DRB 3)) and is present in the buffer component 214 at the time of the periodic update, the threshold (or previous threshold, if applicable) PSI value (e.g., congested PSIprev), and an adjustment value (e.g., congestion PSI step size). As disclosed, in some embodiments, the priority threshold determination component 224 can determine the adjusted threshold PSI value as being equal to the minimum of the highest PSI value associated with any of the PDU sets (e.g., PDU set 706 and PDU set 710) that are present in the buffer component and are associated with the one or more congested DRBs, and a total value of the threshold (or previous threshold, if applicable) PSI value minus the defined adjustment value.

Based at least in part on the results of analyzing the respective PSI values (e.g., PSI 1 720 and PSI 12 722; and PSI 1 724 and PSI 10 726) of the respective PDU sets (e.g., PDU set 706 and PDU set 710) associated with the congested DRBs and present in the buffer component 214, the priority threshold determination component 224 can determine that the highest PSI value associated with a PDU set, associated with a congested DRB and present in the buffer component 214, can be PSI 12, since, with regard to the congested DRBs (e.g., DRB 708 (e.g., DRB 2) or DRB 712 (e.g., DRB 3)), PSI 12 722 is the highest PSI value. Since the DRB 704 (e.g., DRB 1) is not experiencing the congestion condition, the priority threshold determination component 224 can accordingly disregard (e.g., can not include) PSI 15 718 (as well as PSI 10 714 and PSI 12 716) when doing the analysis to determine the highest PSI value at the time of this periodic update. The priority threshold determination component 224 also can determine that the threshold PSI value (e.g., congested PSIprev) is PSI 14, which was utilized during the previous time period. In some embodiments, the defined adjustment value can be 1, although, in other embodiments, the defined adjustment value can be a different value (e.g., greater than 1), in accordance with and/or as indicated or specified by the data management criteria. With these determinations, the priority threshold determination component 224 can determine (e.g., calculate) the adjusted threshold PSI value to be equal to the minimum of PSI 12 and the total value of PSI 14 minus 1 (e.g., adjusted threshold PSI value=max (0, min (12, (14-1)), which can be PSI 12. Accordingly, the priority threshold determination component 224 can set the adjusted threshold PSI value to be PSI 12 728 for the upcoming time period (e.g., the second time period (or first update time period)).

With the adjusted threshold PSI 12 728 being set, the discard component 226 can discard, from the buffer component 214, any data packet(s) in the PDU set 706 that is associated with a PSI value(s) (e.g., PSI 12) that is determined to satisfy the adjusted threshold PSI 12 728. Also, during this upcoming time period, the discard component 226 can utilize (e.g., apply) the adjusted threshold PSI 12 728 when analyzing any other PDU sets that are inserted into the buffer component 214 and are associated with a congested DRB (e.g., DRB 708 (e.g., DRB 2) or DRB 712 (e.g., DRB 3)). If the discard component 226 determines that any PSI values (e.g., PSI 12, PSI 13, PSI 14, or PSI 15) associated with any data packets in those other PDU sets satisfy the adjusted threshold PSI 12 728, the discard component 226 can discard any such data packets from the buffer component 214. As disclosed, the adjusting of the threshold PSI value during the periodic update can facilitate mitigating (e.g., reducing, minimizing, or eliminating) the congestion condition, since using the threshold PSI value for data packet discarding determinations during the previous time period did not resolve the congestion condition.

If, at the end of this update period, the discard manager component 130 determines that the congestion condition has not been resolved, based at least in part on additional congestion information (e.g., congestion indicators or other congestion information) it receives, the discard manager component 130 can perform (e.g., iteratively perform) one or more updates to the adjusted threshold PSI value, and can perform further discarding of certain data packets of PDU sets determined to satisfy the updated threshold PSI value, for example, until the congestion condition is determined to be resolved, in accordance with the defined data management criteria.

It is to be appreciated and understood that, while the above example scenarios involved the same DRBs (e.g., DRB 2 and DRB 3) being congested, and the same DRB (e.g., DRB 1) not being congested over multiple time periods, there may be instances where the DRBs that are experiencing a congestion condition can change from one time period to the next time period. For example, during an initial time period, first congestion information may indicate that DRB 2 associated with a second DU and DRB 3 associated with a third DU are congested, while DRB 1 associated with a first DU is not congested. At the time of the first periodic update, second congestion information may indicate that DRB 1 associated with the first DU and DRB 3 associated with the third DU are congested, while DRB 2 associated with the second DU is not congested.

It also is to be appreciated and understood that, while some of the embodiments and aspects of the system 100 (and the system 200) have been described with regard to DU 120 for reasons of brevity and clarity, in certain embodiments, the RAN 106 can comprise one or more other DUs, such as DU 132 and/or DU 134, that can be associated with the CU 122, respective cells (not shown in FIG. 1 for reasons of brevity and clarity), and/or respective DRBs, and the discard manager component 130 can manage and mitigate discarding of data, such as data packets of PDU sets due to a congestion condition associated with a DRB(s) associated with the one or more other DUs (e.g., 132 and/or 134), and manage and mitigate congestion in the one or more other DUs, using the techniques, methods, and algorithms described herein, in accordance with the defined data management criteria.

Also, in certain embodiments, as disclosed, the system 100 can comprise an O-RAN architecture and environment, and the RAN 106 can be an O-RAN. In some embodiments, in the O-RAN architecture and environment, the system 100 also can comprise a service management and orchestration (SMO) component and RIC (not shown in FIG. 1), wherein the SMO component can be associated with (e.g., communicatively connected to) the RIC and/or the RAN 106 (and/or one or more other RANs) via an interface(s) (e.g., an O1 interface, an A1 interface, or another interface), to facilitate communication of information between the SMO component and the RIC and/or the RAN 106 (and/or one or more other RANs), and the RIC can be associated with the RAN 106 (and/or one or more other RANs) via an interface(s) (e.g., an E2 interface or another interface), to facilitate communication of information between the RIC and the RAN 106 (and/or one or more other RANs).

The SMO component can act and operate as a management and orchestration layer that can control configuration and automation aspects of the RIC and RAN elements of the RAN(s). The SMO component can comprise various types of management services and various network functions, comprising network management functions, which can include RAN-type or RAN-related functions, core management functions, transport management functions, network slice management functions (e.g., end-to-end network slice management functions), and/or other network management functions. In accordance with various embodiments, the network functions can be or can comprise physical network functions, virtualized network functions (e.g., virtual machines (VMs), containers, or other virtualized network functions). At least some of the various network functions (e.g., network management functions or other network functions) can operate in real time or near real time. The RIC can operate to control (e.g., manage) and enhance (e.g., improve or optimize) RAN functions and services of the RAN(s). At least some of the various network functions and components of the RIC can operate in real time or near real time, and some network functions and components of the RIC may operate in non-real time.

In accordance with various embodiments, the RAN 106 can comprise a processor component 228 that can be associated with (e.g., communicatively connected to) and can work in conjunction with other components of the RAN 106, including the base stations (e.g., 108 and/or 110), the DUs (e.g., 120, 132, and/or 134), the CU 122, the RU 124, the discard manager component 130, a data store 230, and/or other components of the RAN 106, to facilitate performing the various functions and operations of the RAN 106. The processor component 228 can employ one or more processors (e.g., one or more central processing units (CPUs)), microprocessors, or controllers that can process information relating to data, files, services, applications, PDU sets, communication networks, RANs, cells, resources, operational states, congestion information or indicators, timers, priority values or levels, threshold priority values or levels, discarding of data, machine learning models, training data, feedback information, data processing operations, messages, notifications, alarms, alerts, preferences (e.g., user or client preferences), hash values, metadata, parameters, traffic flows, policies, the defined data management criteria, algorithms (e.g., enhanced data management algorithms, enhanced data discarding algorithms, hash algorithms, data compression algorithms, data decompression algorithms, and/or other algorithm), interfaces, protocols, tools, and/or other information, to facilitate operation of the RAN 106, and control data flow between the RAN 106 and/or other components (e.g., network components, another RAN, the communication network 102, a device (e.g., 116 or 118), a node, a service, a user, or other entity) associated with the RAN 106.

The data store 230 can store data structures (e.g., user data, metadata), code structure(s) (e.g., modules, objects, hashes, classes, procedures) or instructions, information relating to data, files, services, applications, PDU sets, communication networks, RANs, cells, resources, operational states, congestion information or indicators, timers, priority values or levels, threshold priority values or levels, discarding of data, machine learning models, training data, feedback information, data processing operations, messages, notifications, alarms, alerts, preferences (e.g., user or client preferences), hash values, metadata, parameters, traffic flows, policies, the defined data management criteria, algorithms (e.g., enhanced data management algorithms, enhanced data discarding algorithms, hash algorithms, data compression algorithms, data decompression algorithms, and/or other algorithm), interfaces, protocols, tools, and/or other information, to facilitate controlling or performing operations associated with the RAN 106. The data store 230 can comprise volatile and/or non-volatile memory, such as described herein. In an aspect, the processor component 228 can be functionally coupled (e.g., through a memory bus) to the data store 230 in order to store and retrieve information desired to operate and/or confer functionality, at least in part, to the base stations (e.g., 108 and/or 110), DUs (e.g., 120, 132, and/or 134), CU 122, RU 124, discard manager component 130, processor component 228, data store 230, and/or other component of the RAN 106, and/or substantially any other operational aspects of RAN 106.

As disclosed, the data store 230 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In accordance with some embodiments, the discard manager component 130 can comprise or be associated with an artificial intelligence (AI) component 232 that can employ AI, machine learning, and/or other AI-type techniques and algorithms to determine priority levels or values associated with PDU sets, determine or adapt threshold (e.g., initial or adjusted) priority levels or values, determine or adapt an amount of time for a timer, determine or adapt an amount of time for a periodic update period, determine or adapt an adjustment value, determine whether a congestion condition exists or has been resolved, determine an operational state that the discard manager component 130 is to be in at a particular time, determine whether to discard a particular data packet of a particular PDU set, and/or perform other desired functions or operations. In some embodiments, the AI component 250 can comprise, generate, and/or train machine learning models that can be trained to determine priority levels or values associated with PDU sets, determine or adapt threshold priority levels or values, determine or adapt an amount of time for a timer, determine or adapt an amount of time for a periodic update period, determine or adapt an adjustment value, determine whether a congestion condition exists or has been resolved, determine an operational state that the discard manager component 130 is to be in at a particular time, determine whether to discard a particular data packet of a particular PDU set, and/or perform other desired functions or operations.

For instance, the AI component 232 can employ a trainer component 234 that can train (or refine or update training of) a (trained) machine learning model to learn to determine priority levels or values associated with PDU sets, determine or adapt threshold priority levels or values, determine or adapt an amount of time for a timer, determine or adapt an amount of time for a periodic update period, determine or adapt an adjustment value, determine whether a congestion condition exists or has been resolved, determine an operational state that the discard manager component 130 is to be in at a particular time, determine whether to discard a particular data packet of a particular PDU set, and/or perform other desired functions or operations, based at least in part on application of training data and/or feedback information relating to priority levels or values associated with PDU sets, threshold priority levels or values, timers, periodic update periods, adjustment values, congestion conditions, operational states of the discard manager component 130, discarding of data packets of PDU sets, the defined data management criteria, and/or other data to the (trained) machine learning model. Such training of the trained machine learning model can enable the trained machine learning model to learn to determine priority levels or values associated with PDU sets, determine or adapt threshold priority levels or values, determine or adapt an amount of time for a timer, determine or adapt an amount of time for a periodic update period, determine or adapt an adjustment value, determine whether a congestion condition exists or has been resolved, determine an operational state that the discard manager component 130 is to be in at a particular time, determine whether to discard a particular data packet of a particular PDU set, and/or perform or automate other desired functions or operations.

In certain embodiments, the trained machine learning model can perform a machine learning-based analysis on information relating to priority levels or values associated with PDU sets, threshold priority levels or values, timers, periodic update periods, adjustment values, congestion conditions, operational states of the discard manager component 130, discarding of data packets of PDU sets, the defined data management criteria, and/or the other desired information. Based at least in part on the results of the machine learning-based analysis on such information, the trained machine learning model can determine or infer a priority level or value associated with a PDU set, determine or infer a threshold priority level or value or an adaptation that can be made to a threshold priority level or value, determine or infer an amount of time for a timer or an adaptation that can be made to an amount of time for a timer, determine or infer an amount of time for a periodic update period or an adaptation that can be made to an amount of time for a periodic update period, determine or infer an adjustment value or an adaptation that can be made to an adjustment value, determine or infer whether a congestion condition exists or has been resolved, determine or infer an operational state that the discard manager component 130 is to be in at a particular time, determine or infer whether to discard a particular data packet of a particular PDU set, and/or perform other desired functions or operations. For example, based at least in part on the machine learning-based analysis results, the trained machine learning model can determine whether there are one or more data patterns in the data that can indicate an adaptation that can be made to a threshold priority level or value (e.g., to be utilized for data packet discarding determinations), an adaptation that can be made to an amount of time for a timer, and/or an adaptation that can be made to an amount of time for a periodic update period, to facilitate mitigating data packet discarding and/or mitigating congestion in the DU and/or CU-UP. In some embodiments, the trained machine learning model can determine a probability (e.g., probability value) that a particular adaptation to a threshold priority level or value (e.g., to be utilized for data packet discarding determinations), a certain adaptation to an amount of time for a timer, and/or another particular adaptation to an amount of time for a periodic update period can be desirable (e.g., suitable, usable, or optimal) to mitigate data packet discarding and/or mitigate congestion in the DU and/or CU-UP. The discard manager component 130, AI component 232, or the trained machine learning model can determine whether the particular adaptation to the threshold priority level or value, the certain adaptation to the amount of time for the timer, and/or the other particular adaptation to the amount of time for the periodic update period can be desirable (e.g., suitable, usable, or optimal) and/or is to be implemented based at least in part on the probability and a defined threshold probability (e.g., a defined threshold probability value) relating to threshold priority levels or values, timers, and/or periodic update periods, and/or based at least in part on whether there are one or more data patterns in the data that can indicate whether the particular adaptation to the threshold priority level or value, the certain adaptation to the amount of time for the timer, and/or the other particular adaptation to the amount of time for the periodic update period can be desirable to mitigate data packet discarding and/or mitigate congestion in the DU and/or CU-UP.

For instance, the discard manager component 130, the AI component 232, or the trained machine learning model can compare the probability to the defined threshold probability to determine whether the probability satisfies (e.g., meets or exceeds; is at or greater than) the defined threshold probability. If, based at least in part on the results of such comparison, the discard manager component 130, the AI component 232, or the trained machine learning model determines that the probability does not satisfy (e.g., is less than) the defined threshold probability, the discard manager component 130, the AI component 232, or the trained machine learning model can determine that the particular adaptation to the threshold priority level or value, the certain adaptation to the amount of time for the timer, and/or the other particular adaptation to the amount of time for the periodic update period is not desirable (e.g., not suitable, usable, or optimal) to mitigate data packet discarding and/or mitigate congestion in the DU and/or CU-UP. If, instead, based at least in part on the comparison results, the discard manager component 130, the AI component 232, or the trained machine learning model determines that the probability does satisfy the defined threshold probability, the discard manager component 130, the AI component 232, or the trained machine learning model can determine that the particular adaptation to the threshold priority level or value, the certain adaptation to the amount of time for the timer, and/or the other particular adaptation to the amount of time for the periodic update period can be desirable and/or can be implemented to mitigate data packet discarding and/or mitigate congestion in the DU and/or CU-UP.

With further regard to the discard manager component 130, the AI component 232 can perform an AI and/or machine learning-based analysis on data, such as information relating to files, services, applications, communication networks, PDU sets, RANs, cells, resources, operational states, congestion information or indicators, timers, priority values or levels, threshold priority values or levels, discarding of data, training data, feedback information, data processing operations, messages, notifications, alarms, alerts, preferences (e.g., user or client preferences), hash values, metadata, parameters, traffic flows, policies, the defined data management criteria, interfaces, protocols, tools, and/or other information, such as more fully described herein. In connection with or as part of such an AI or machine learning-based analysis, the AI component 232 can employ, build (e.g., construct or create), and/or import, AI and/or machine learning techniques and algorithms, AI and/or machine learning models (e.g., trained models), neural networks (e.g., trained neural networks), Markov chains (e.g., trained Markov chains), and/or graph mining to render and/or generate predictions, inferences, calculations, prognostications, estimates, derivations, forecasts, detections, and/or computations that can facilitate determining or learning data patterns in data, determining or learning a correlation, relationship, or causation between an item(s) of data and another item(s) of data (e.g., occurrence of the other item(s) of data or an event relating thereto), determining or learning a correlation, relationship, or causation between an event and another event (e.g., occurrence of another event), determining or learning about relationships between components (e.g., base stations, cells, network nodes, communication links, devices, or other components or functions) of or associated with the communication network 102, determining or learning about resources, determining or learning about priority levels or values associated with PDU sets, determining or learning about threshold priority levels or values (e.g., that can be utilized for data packet discarding determinations), determining or learning about an amount of time to be used for setting of a timer, determining or learning about an amount of time for a periodic update period, determining or learning about adjustment values that can be applied in determinations of threshold priority levels or values, determining or learning about congestion conditions associated with RANs, determine or learning effects of having the discard manager component 130 in respective operational states under respective conditions or circumstances, determine or learn about discarding of data packets of PDU sets, and/or perform other desired functions or operations and/or automating one or more functions or features of the disclosed subject matter, as more fully described herein.

Based at least in part on the results of the analysis, the AI component 232 can determine, train, and generate one or more models (e.g., machine learning model or other model), such as described herein, wherein the models can model or be representative of respective features and/or respective historical performance of the communication network, RAN, cells, discard manager component, DRBs, services, and/or other functions, features, or operations, such as described herein. The AI component 232 can update (e.g., modify, adjust, refine, or change), and further train and enhance, the model as additional data (e.g., information relating to further operation of or modifications to the communication network, RAN, cells, discard manager component, DRBs, and/or services; output results output from the machine learning model; the feedback information; and/or other information) is received and analyzed by the AI component 232 or model. In some embodiments, as part of the data analysis, and the determining and training of the models, the AI component 232 can employ (and/or train) Markov chains, a neural network(s), or other AI-based or machine learning-based modeling, techniques, functions, or algorithms.

The AI component 232 can employ various AI-based or machine learning-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 232 can examine the entirety or a subset of the data (e.g., the training data, the feedback information, other information, such as described herein) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f (z)=confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 8:
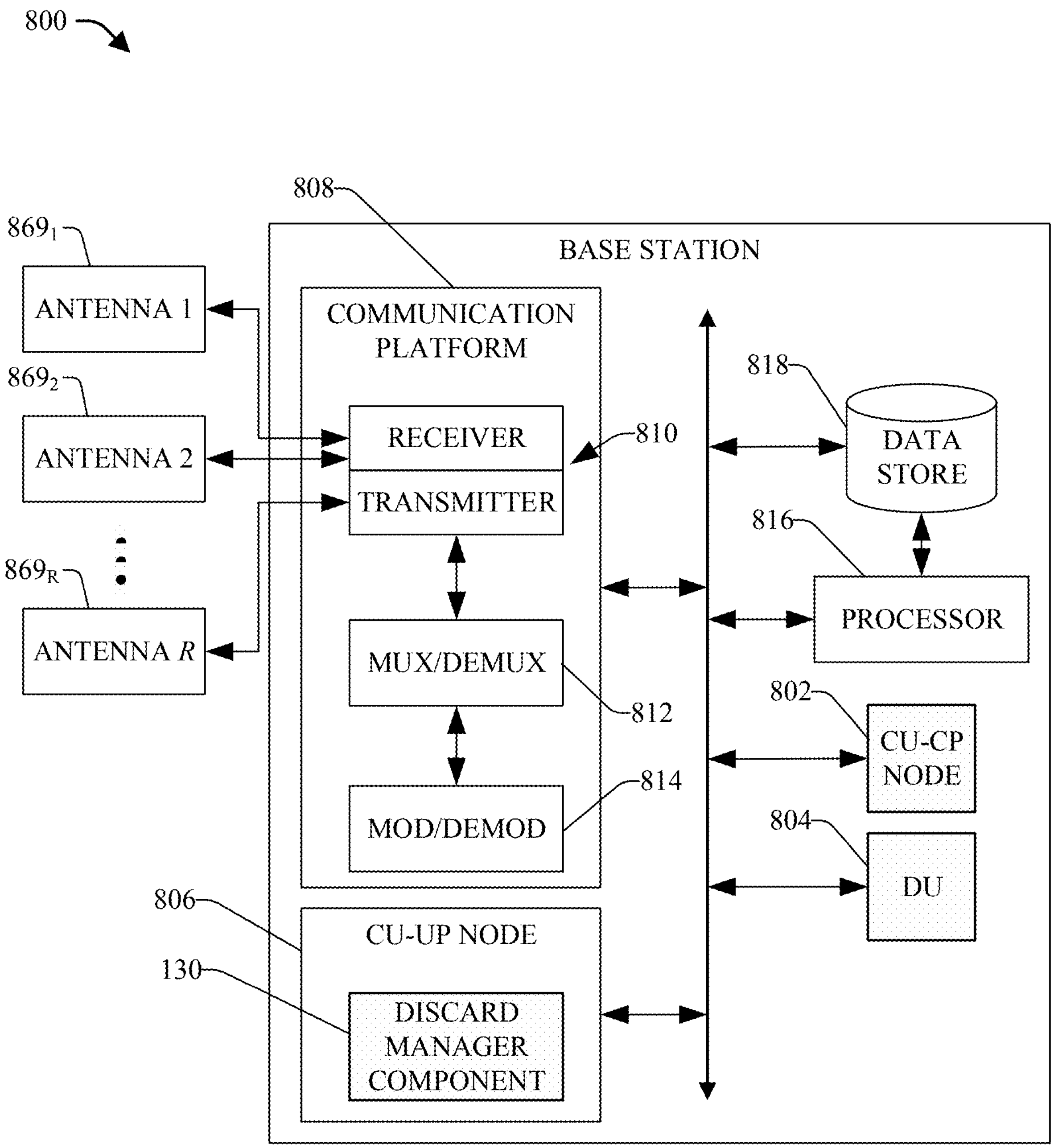
FIG. 8 depicts a diagram of a non-limiting example base station that can desirably facilitate connections and communication of information associated with devices, in accordance with various aspects and embodiments of the disclosed subject matter.

Turning to FIG. 8, FIG. 8 depicts a diagram of a non-limiting example base station 800 that can desirably facilitate (e.g., enable) connections (e.g., wireless connections) and communication of information associated with devices, in accordance with various aspects and embodiments of the disclosed subject matter. In some embodiments, the base station 800 can be a 5G or other NR base station (e.g., gNB or other NR-type or xG base station, wherein x can be a number greater than 5). In other embodiments, the base station 800 can be a 4G or LTE base station, or some other type of base station (e.g., other type of access point).

With regard to a 5G or other NR base station, the base station 800 can comprise a CU-CP node 802 (e.g., a gNB or other NR-NB CU-CP node), one or more DUs (e.g., a gNB or other NR-NB DUs), including DU 804, a desired number of CU-UP nodes (e.g., a gNB or other NR-NB CU-UP nodes), including CU-UP node 806, and/or other network equipment. The CU-CP node 802 can be associated or interfaced with the DUs (e.g., DU 804) via an interface (e.g., F1-C interface) or connection. The CU-CP node 802 can be associated or interfaced with the CU-UP nodes (e.g., CU-UP node 806) via an interface (e.g., E1 interface) or connection. The one or more CU-UP nodes (e.g., CU-UP node 806) can be associated or interfaced with the one or more DUs (e.g., DU 804) via an interface (e.g., F1-U interface) or connection.

A DU (e.g., DU 804) can provide support for lower layers of a protocol stack. For instance, a DU (e.g., DU 804) can be a logical node that can host or handle baseband (e.g., PHY) and L2 (e.g., MAC and RLC layer) functionality associated with the base station 800. A CU-UP node (e.g., CU-UP node 806) can be a logical node that can host or handle data traffic between the core network 104 (e.g., 5G or other NR or xG core network) and the DU(s) (e.g., DU 804) to which the particular CU-UP is connected. The CU-CP node 802 can be a logical node that can host or handle L3 (e.g., RRC and packet data convergence protocol (PDCP) layer) control plane functionality associated with the base station 800.

In some embodiments, a device(s) (e.g., device(s) 116 and/or 118) can be connected to the base station 800, via the DU 804, wherein the CU-UP node 806 and the DU 804 can be serving the device by performing or facilitating performing downlink data transfers of downlink data to the device from a data source (e.g., a service and/or another device, or a network component of the communication network 102 or core network 104 (e.g., via the UPF node)), and uplink data transfers of uplink data from the device to a desired destination (e.g., the data source) via the base station 800.

The base station 800 can receive and transmit signal(s) from and to wireless devices like access points (e.g., base stations, femtocells, picocells, or other type of access point), access terminals (e.g., UEs), wireless ports and routers, and the like, through a set of antennas 8691-869R. In an aspect, the antennas 8691-869R can be a part of a communication platform 808, which comprises electronic components and associated circuitry that can provide for processing and manipulation of received signal(s) and signal(s) to be transmitted. In an aspect, the communication platform 808 can include a receiver/transmitter 810 that can convert signal from analog to digital upon reception, and from digital to analog upon transmission. In addition, receiver/transmitter 810 can divide a single data stream into multiple, parallel data streams, or perform the reciprocal operation. In accordance with various embodiments, the communication platform 808 can be, can comprise, or can be associated with an RU (e.g., a gNB or other NR-NB RU node).

In an aspect, coupled to receiver/transmitter 810 can be a multiplexer/demultiplexer (mux/demux) 812 that can facilitate manipulation of signal in time and frequency space. The mux/demux 812 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 812 can scramble and spread information (e.g., codes) according to substantially any code known in the art, e.g., Hadamard-Walsh codes, Baker codes, Kasami codes, polyphase codes, and so on. A modulator/demodulator (mod/demod) 814 also can be part of the communication platform 808, and can modulate information according to multiple modulation techniques, such as frequency modulation, amplitude modulation (e.g., M-ary quadrature amplitude modulation (QAM), with M a positive integer), phase-shift keying (PSK), and the like.

The base station 800 also can comprise a processor(s) 816 that can be configured to confer and/or facilitate providing functionality, at least partially, to substantially any electronic component in or associated with the base station 800. For instance, the processor(s) 816 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, and/or other operations on data.

In another aspect, the base station 800 can include a data store 818 that can store data structures; code instructions; rate coding information; information relating to measurement of radio link quality or reception of information related thereto; information relating to devices, communication conditions or performance indicators associated with devices (e.g., signal-to-interference-plus-noise ratio (SINR), reference signal received power (RSRP), reference signal received quality (RSRQ), channel quality indicator (CQI), and/or other wireless communications metrics or parameters) associated with devices, metadata, policies and rules, users, applications, services, PDU sets, communication networks, RANs, cells, resources, operational states, congestion information or indicators, timers, priority values or levels, threshold priority values or levels, discarding of data, data processing operations, messages, notifications, alarms, alerts, preferences (e.g., user or client preferences), hash values, metadata, parameters, traffic flows, policies, the defined data management criteria, traffic flows, signaling, algorithms (e.g., data management algorithm(s), data (e.g., data packet of PDU set) discarding algorithm(s), uplink grant scheduling algorithm(s), downlink scheduling algorithm(s), or other algorithm(s)), protocols, interfaces, tools, and/or other information; white list information, information relating to managing or maintaining the white list; system or device information like policies and specifications; code sequences for scrambling; spreading and pilot transmission; floor plan configuration; base station deployment and frequency plans; scheduling policies; and so on. The processor(s) 816 can employ one or more processors (e.g., one or more CPUs), microprocessors, or controllers) that can process information, and can be coupled to the data store 818 in order to store and retrieve at least some of the information (e.g., information, such as algorithms, relating to multiplexing/demultiplexing or modulation/demodulation; information relating to radio link levels; information relating to devices, communication conditions associated with devices, metadata, communication devices, policies and rules, users, applications, services, PDU sets, communication networks, RANs, cells, resources, operational states, congestion information or indicators, timers, priority values or levels, threshold priority values or levels, discarding of data, data processing operations, messages, notifications, alarms, alerts, preferences (e.g., user or client preferences), hash values, metadata, parameters, traffic flows, policies, the data management criteria, traffic flows, signaling, algorithms (e.g., data management algorithm(s), data (e.g., data packet of PDU set) discarding algorithm(s), uplink grant scheduling algorithm(s), downlink scheduling algorithm(s), or other algorithm(s)), protocols, interfaces, tools, and/or other information) desired to operate and/or confer functionality to the communication platform 808 and/or other operational components of the base station 800.

The data store 818 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In accordance with various embodiments, the base station 800 (e.g., the CU-UP node 806 of the base station 800) can comprise or be associated with a discard manager component 130 that can that can desirably (e.g., automatically, dynamically, suitably, reliably, efficiently, enhancedly, and/or optimally) manage and mitigate congestion in one or more RANs of the communication network, and manage and mitigate the discarding of data (e.g., data packets of PDU sets) when there is congestion in the RAN(s) (e.g., congestion in the DU and/or CU-UP of the RAN), such as described herein.

Figure 9:
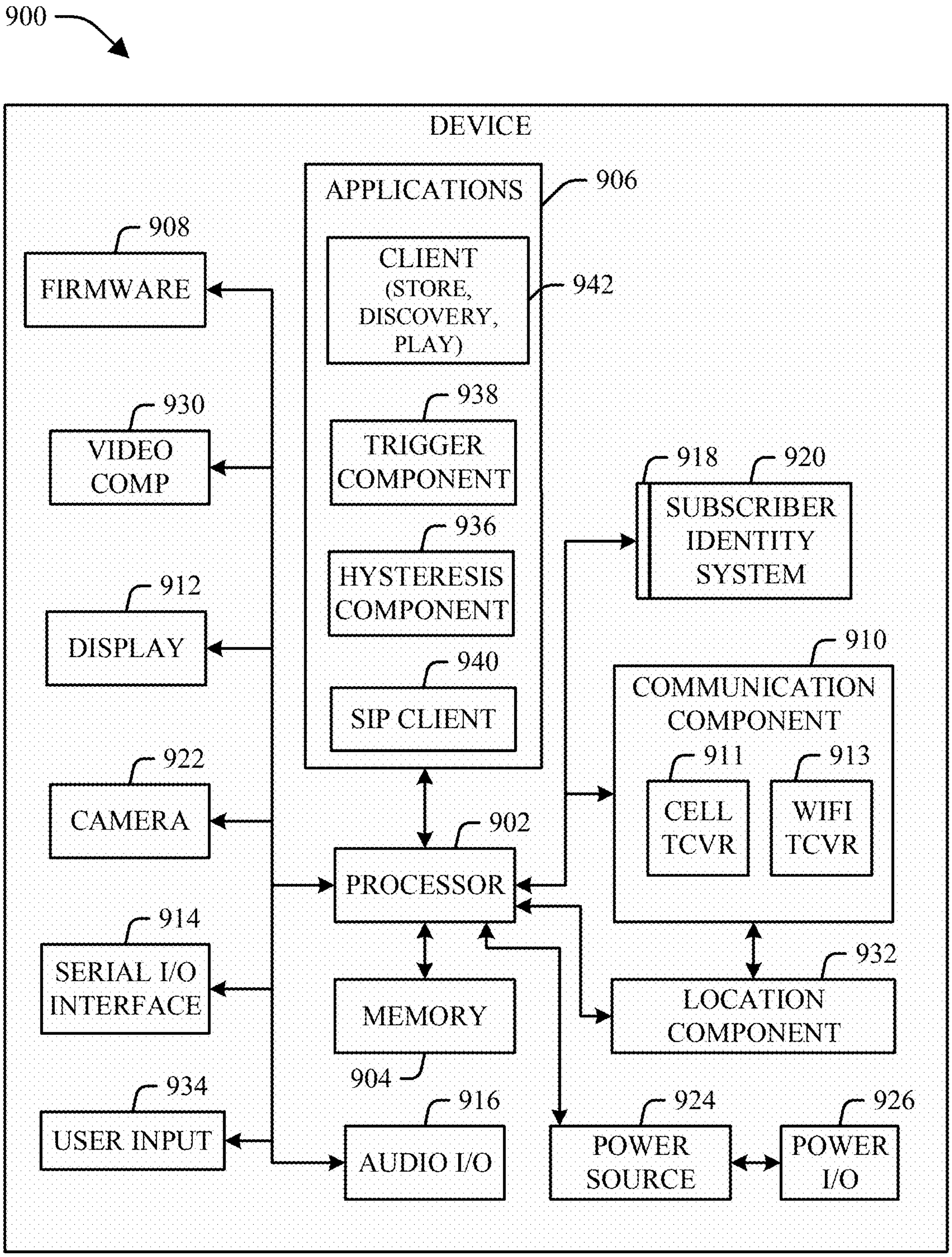
FIG. 9 illustrates a diagram of a non-limiting example device that can be operable to engage in a system architecture that facilitates wireless communications according to one or more embodiments described herein, in accordance with various aspects and embodiments of the disclosed subject matter.

Referring to FIG. 9, FIG. 9 illustrates a diagram of a non-limiting example device 900 (e.g., wireless or mobile phone, electronic pad or tablet, electronic eyewear, electronic watch, other electronic bodywear, IoT device, or other type of communication device or UE) that can be operable to engage in a system architecture that facilitates wireless communications according to one or more embodiments described herein, in accordance with various aspects and embodiments of the disclosed subject matter. Although a device is illustrated herein, it will be understood that other devices can be a communication device, and that the device 900 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device, such as the device 900, can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

The device 900 can include a processor(s) 902 for controlling and processing all onboard operations and functions. The processor(s) 902 can comprise one or more processors (e.g., one or more central processing units (CPUs)), microprocessors, or controllers) that can process information associated with the device 900. A memory 904 can interface to the processor(s) 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor(s) 902 from either or both the memory 904 or/and the firmware 908. The firmware 908 can also store startup code for execution in initializing the device 900. A communication component 910 interfaces to the processor(s) 902 to facilitate wired/wireless communication with external systems, e.g., cellular networks, VoIP networks, and so on. Here, the communication component 910 can also include a suitable cellular transceiver 911 (e.g., a global system for mobile communication (GSM), orthogonal frequency division multiple access (OFDMA), 4G, LTE, 5G, other NR, or other type of transceiver) and/or an unlicensed transceiver 913 (e.g., Wi-Fi, WiMax) for corresponding signal communications. The device 900 can be a device such as a cellular telephone, a PDA with mobile communications capabilities, and messaging-centric devices. The communication component 910 also facilitates communications reception from terrestrial radio networks (e.g., broadcast), digital satellite radio networks, and Internet-based radio services networks.

The device 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor(s) 902 to facilitate wired and/or wireless serial communications (e.g., USB, and/or IEEE 1394) through a hardwire connection, and other serial input devices (e.g., a keyboard, keypad, and mouse). This supports updating and troubleshooting the device 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The device 900 can include a slot interface 918 for accommodating a SIC (Subscriber Identity Component) in the form factor of a card Subscriber Identity Module (SIM) or universal SIM 920, and interfacing the SIM card 920 with the processor(s) 902. However, it is to be appreciated that the SIM card 920 can be manufactured into the device 900, and updated by downloading data and software.

The device 900 can process IP data traffic through the communication component 910 to accommodate IP traffic from an IP network such as, for example, the Internet, a corporate intranet, a home network, a person area network, etc., through an ISP or broadband cable provider. Thus, VOIP traffic can be utilized by the device 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The device 900 also includes a power source 924 in the form of batteries and/or an AC power subsystem, which power source 924 can interface to an external power system or charging equipment (not shown) by a power I/O component 926.

The device 900 can also include a video component 930 for processing video content received and, for recording and transmitting video content. For example, the video component 930 can facilitate the generation, editing and sharing of video quotes. A location tracking component 932 facilitates geographically locating the device 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the device 900 to support SIP protocols and register the subscriber with the SIP registrar server. The applications 906 can also include a client 942 that provides at least the capability of discovery, play and store of multimedia content, for example, music.

The device 900, as indicated above related to the communication component 910, includes an indoor network radio transceiver 913 (e.g., Wi-Fi transceiver). This function supports the indoor radio link, such as IEEE 802.11, for the dual-mode GSM device (e.g., device 900). The device 900 can accommodate at least satellite radio services through a device (e.g., handset device) that can combine wireless voice and digital radio chipsets into a single device (e.g., single handheld device).

It is to be appreciated and understood that one or more components (e.g., the devices, discard manager component, base station, core network, or other component) of the systems (e.g., system 100, system 200, or other system) or methods described herein can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 10:
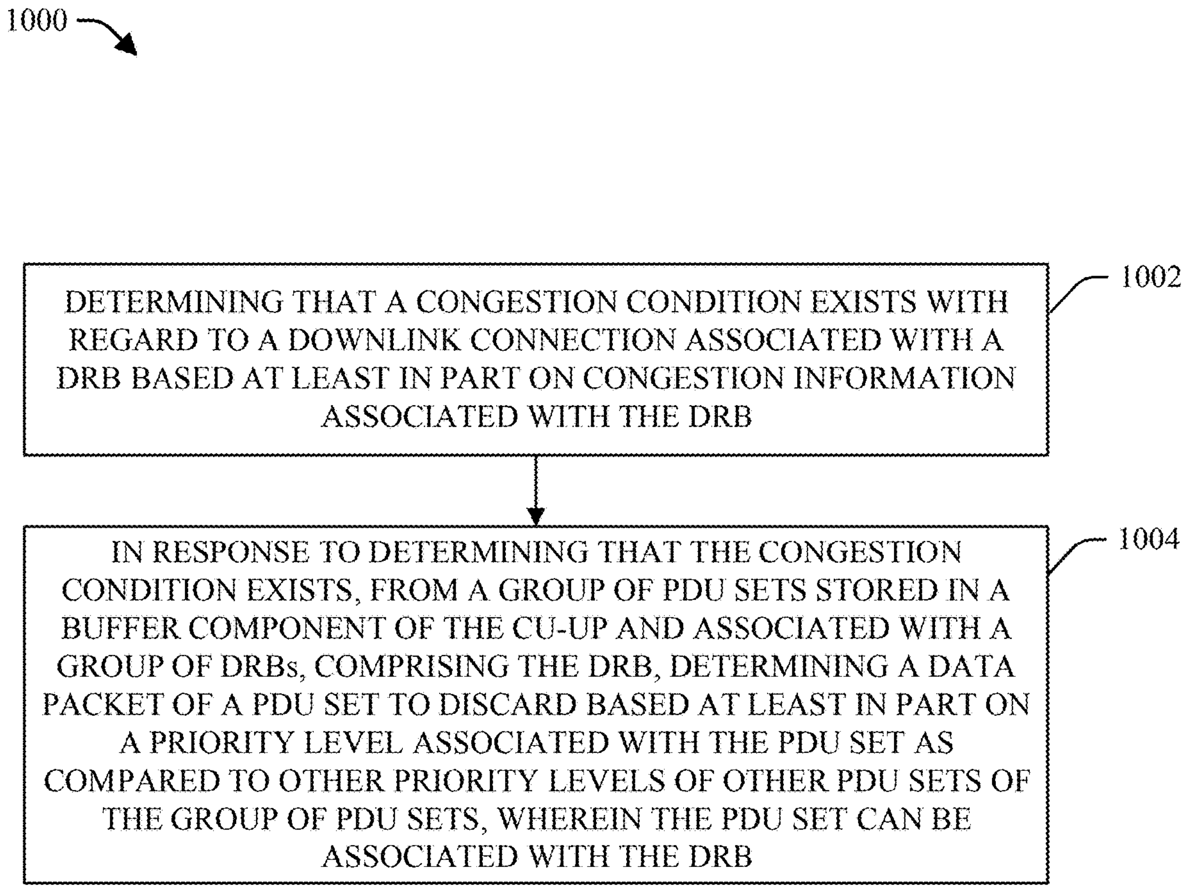
FIG. 10 illustrates a flow chart of an example method that can desirably manage and mitigate discarding of data, such as data packets of PDU sets, in accordance with various aspects and embodiments of the disclosed subject matter.
Figure 11:
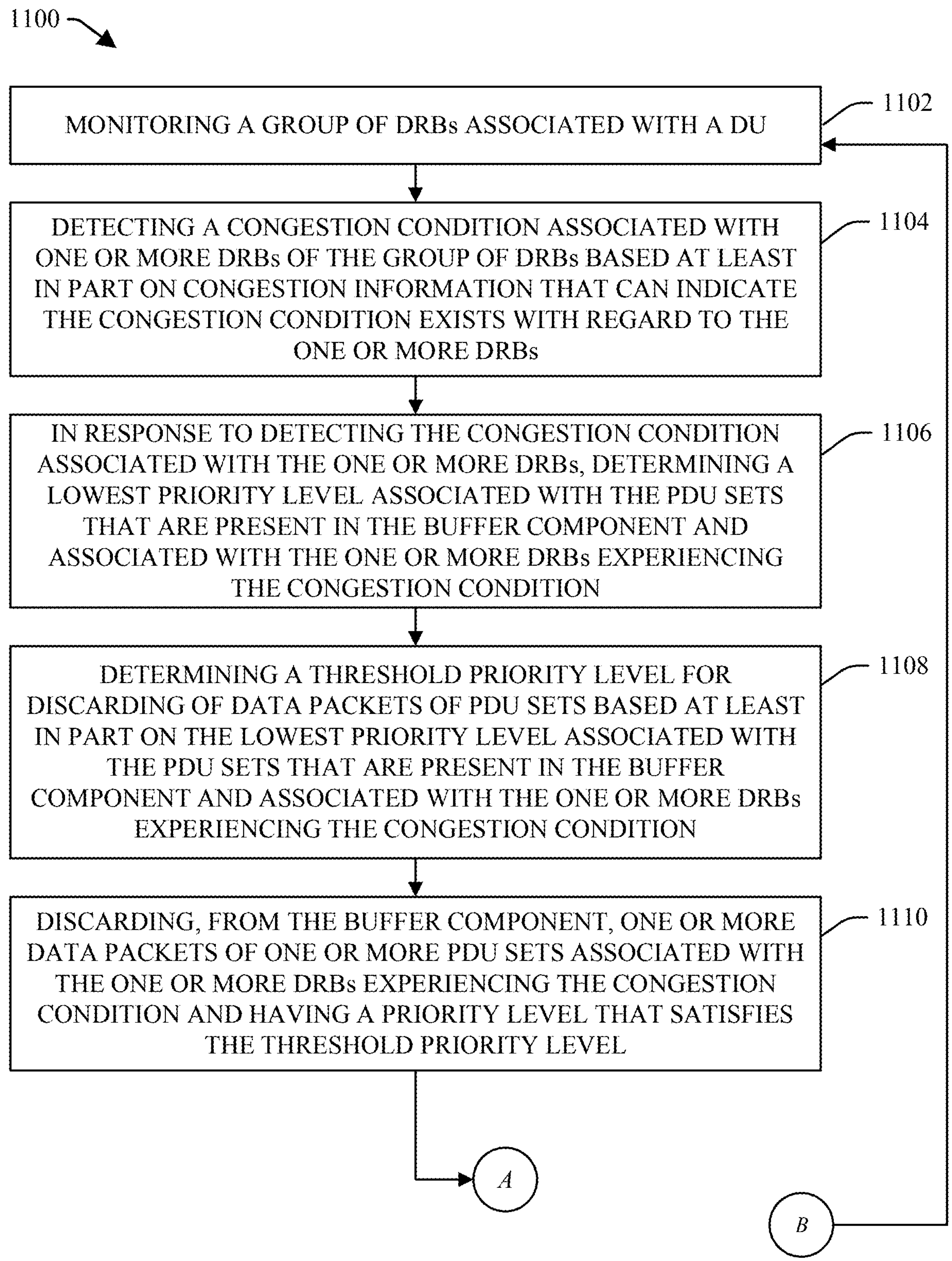
FIGS. 11 and 12 depict a flow chart of an example method that can desirably manage and mitigate discarding of data, such as data packets of PDU sets, and manage and mitigate congestion in a RAN of a communication network, in accordance with various aspects and embodiments of the disclosed subject matter.
Figure 12:
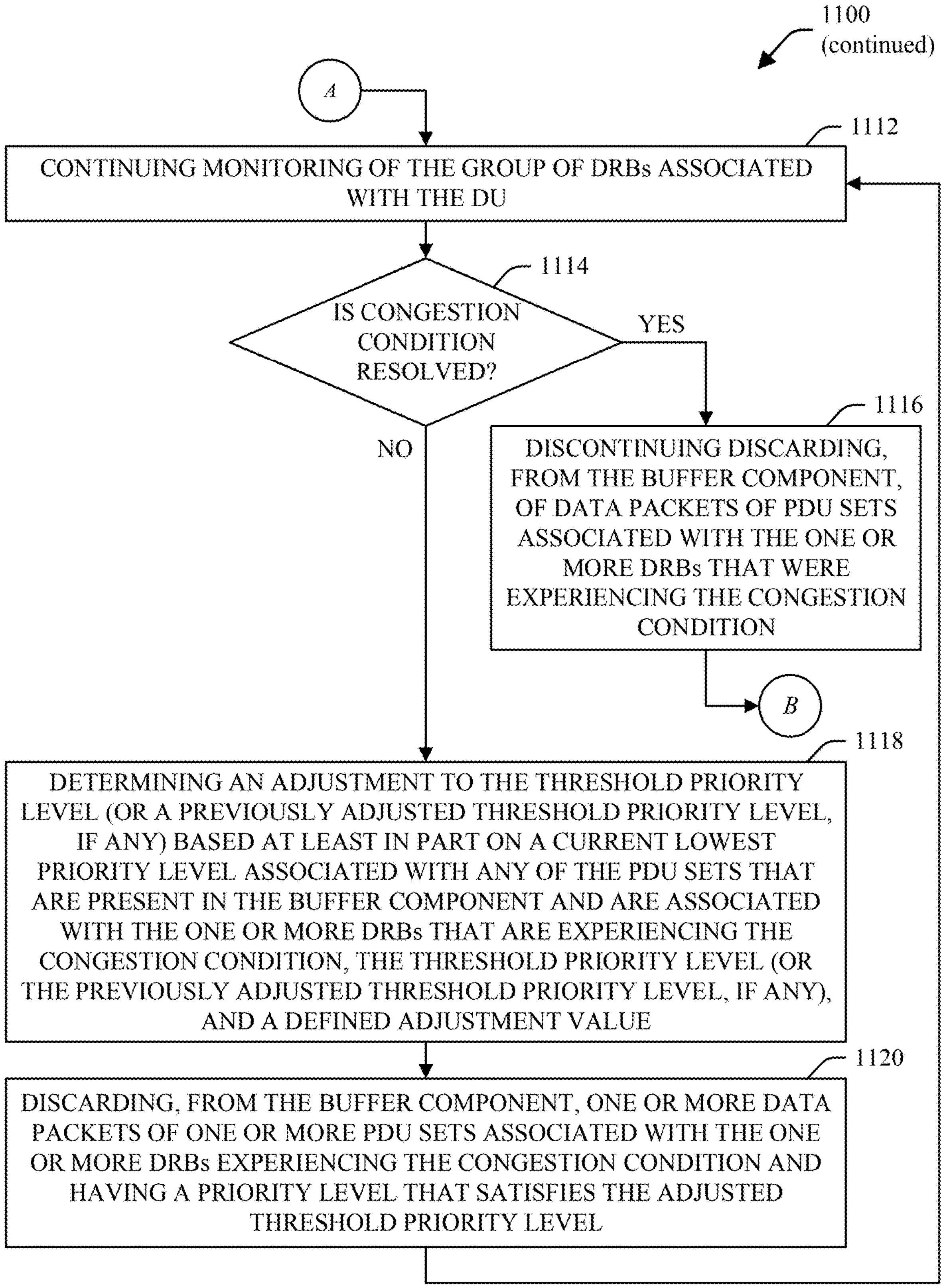

In view of the example systems and/or devices described herein, example methods that can be implemented in accordance with the disclosed subject matter can be further appreciated with reference to flowcharts in FIGS. 10-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 illustrates a flow chart of an example method 1000 that can desirably (e.g., automatically, dynamically, suitably, reliably, efficiently, enhancedly, and/or optimally) manage and mitigate discarding of data, such as data packets of PDU sets (e.g., due to a congestion condition associated with a DRB(s) associated with a DU or CU-UP), in accordance with various aspects and embodiments of the disclosed subject matter. The method 1000 can be employed by, for example, a system comprising the discard manager component, which can comprise or be associated with the processor component, the data store, and/or other components.

At 1002, a determination can be made that a congestion condition exists with regard to a downlink connection associated with a DRB based at least in part on congestion information associated with the DRB. For instance, the discard manager component, employing the congestion detector component, can detect or determine that the congestion condition exists with regard to the downlink connection associated with the DRB based at least in part on the congestion information associated with the DRB. In some embodiments, if the congestion is in a DU, the congestion information can comprise a congestion indicator that can be received from the DU by the resource management component of the CU-UP. In certain embodiments, if the congestion is in the CU-UP, the discard manager component can receive the congestion information from another component of the CU-UP. The DRB can be one DRB of one or more DRBs that can be associated with one or more DUs associated with the CU-UP, wherein the DRB and/or one or more other DRBs associated with the one or more DUs can be experiencing the congestion condition.

At 1004, in response to determining that the congestion condition exists, from a group of PDU sets stored in a buffer component of the CU-UP and associated with a group of DRBs, comprising the DRB, a data packet of a PDU set to discard can be determined based at least in part on a priority level associated with the PDU set as compared to other priority levels of other PDU sets of the group of PDU sets, wherein the PDU set can be associated with the DRB. For instance, in response to determining or detecting that the congestion condition associated with the DRB exists, the discard manager component can determine, from the group of PDU sets stored in the buffer component of the CU-UP and associated with the group of DRBs, a data packet(s) of the PDU set that can be discarded from the buffer component based at least in part on the priority level associated with the PDU set (e.g., the priority level associated with the data packet(s) of the PDU set) as compared to (e.g., relative to) the other priority levels of the other PDU sets of the group of PDU sets, wherein the PDU set can be associated with the DRB (e.g., the congested DRB), such as described herein. For example, the discard manager component can determine that the data packet(s) of the PDU set having the lowest priority level (e.g., the highest PSI level) and associated with the congested DRB can be discarded from the buffer component.

FIGS. 11 and 12 depict a flow chart of an example method 1100 that can desirably (e.g., automatically, dynamically, suitably, reliably, efficiently, enhancedly, and/or optimally) manage and mitigate discarding of data, such as data packets of PDU sets (e.g., due to a congestion condition associated with a DRB(s) associated with a DU or CU-UP), and manage and mitigate congestion in a RAN (e.g., manage and mitigate congestion in the DU or CU-UP of the RAN) of a communication network, in accordance with various aspects and embodiments of the disclosed subject matter. The method 1100 can be employed by, for example, a system comprising the discard manager component, which can comprise or be associated with the processor component, the data store, and/or other components.

At 1102, a group of DRBs associated with a DU can be monitored. The discard manager component, employing the congestion detector component, can monitor the group of DRBs, comprising one or more DRBs, associated with the DU to facilitate determining whether a congestion condition exists for one or more of the DRBs. The congestion detector component can perform such monitoring for one or more DUs of the RAN.

At 1104, a congestion condition associated with one or more DRBs of the group of DRBs can be detected based at least in part on congestion information that can indicate the congestion condition exists with regard to the one or more DRBs. In some embodiments, in connection with the monitoring, the congestion detector component can receive the congestion information, comprising a congestion indicator, from the DU, wherein the congestion information can indicate that one or more of the DRBs associated with the DU are experiencing the congestion condition. In other embodiments, the CU-UP associated with the DU can be experiencing the congestion condition, and the congestion detector component can receive the congestion information (e.g., congestion information other than the congestion indicator that can be provided by the DU) from another component of the CU-UP, wherein the congestion condition at the CU-UP also can mean that the group of DRBs associated with the DU can be experiencing the congestion condition.

At 1106, in response to detecting the congestion condition associated with the one or more DRBs, a lowest priority level associated with the PDU sets that are present in the buffer component and associated with the one or more DRBs experiencing the congestion condition can be determined. In response to detecting the congestion condition associated with the one or more DRBs, the discard manager component can analyze the respective priority levels (e.g., PSI values) associated with the respective PDU sets (e.g., associated with respective data packets of the respective PDU sets) that are present in the buffer component and associated with the one or more DRBs experiencing the congestion condition. Based at least in part on the results of such analysis, the discard manager component can determine the lowest priority level (e.g., the highest PSI value) associated with the PDU sets that are present in the buffer component and associated with the one or more DRBs experiencing the congestion condition.

At 1108, a threshold priority level for discarding of data packets of PDU sets can be determined based at least in part on the lowest priority level associated with the PDU sets that are present in the buffer component and associated with the one or more DRBs experiencing the congestion condition. In some embodiments, the discard manager component can determine the threshold priority level (e.g., threshold PSI value) for discarding of data packets of PDU sets (e.g., associated with the one or more congested DRBs) based at least in part on the lowest priority level (e.g., at the lowest priority level) associated with the PDU sets that are present in the buffer component and associated with the one or more DRBs experiencing the congestion condition. For instance, the discard manager component can determine that the threshold priority level can be set at the lowest priority level associated with the PDU sets that are present in the buffer component and associated with the one or more DRBs experiencing the congestion condition.

At 1110, one or more data packets of one or more PDU sets associated with the one or more DRBs experiencing the congestion condition and having a priority level that satisfies the threshold priority level can be discarded from the buffer component. The discard manager component can discard, from the buffer component, the one or more data packets of the one or more PDU sets that are associated with the one or more DRBs experiencing the congestion condition and have the priority level that is determined to satisfy the threshold priority level (e.g., that have PSI values that are at or higher than the threshold PSI value).

In some embodiments, in response to the detection of the congestion condition, the discard manager component can set the first timer (e.g., congestion detection wait timer) for the first defined amount of time, and can continue to monitor to determine whether the congestion condition associated with the one or more DRBs continues to exist for at least the first defined amount of time before the discard manager component transitions from the inactive state to the active state, such as described herein. If the congestion condition is resolved before the first timer expires (e.g., before the first defined amount of time expires or elapses), the discard manager component can remain in the inactive state, and no discarding of data packets of PDU sets will occur, such as described herein. If, instead, the congestion condition is still ongoing when the first timer expires, the discard manager component can transition from the inactive state to the active state, and, while in the active state, can determine the lowest priority level, determine the threshold priority level, and discard the one or more data packets of the one or more PDU sets that satisfy the threshold priority level, such as described herein. During the time after the threshold priority level has been set (e.g., until the congestion condition is resolved, or until the threshold priority level is adjusted during an update), the discard manager component can discard, from the buffer component, any data packets of any PDU sets that are associated the one or more DRBs that are experiencing the congestion condition and have the priority level that satisfies the threshold priority level.

At this point, the method 1100 can proceed to reference point A, wherein the method 1100 can continue from reference point A as depicted in FIG. 12.

At 1112, the group of DRBs associated with the DU can continue to be monitored. The discard manager component, employing the congestion detector component, can continue to monitor the group of DRBs associated with the DU to facilitate determining whether the congestion condition experienced by the one or more DRBs is resolved or, instead, continues to exist, and/or otherwise determine whether there are any other changes in the congestion associated with the group of DRBs (e.g., a change in which DRBs are experiencing the congestion condition).

At 1114, a determination can be made regarding whether the congestion condition associated with the one or more DRBs has been resolved. In connection with the continued monitoring of the group of DRBs, the discard manager component can determine whether the congestion condition associated with the one or more DRBs has been resolved based at least in part on congestion-related information received by the congestion detector component. For example, when the congestion condition is at the DU, the congestion detector component may continue to receive a congestion indicator from the DU that indicates that the congestion condition still exists with regard to the one or more DRBs, the congestion detector component may receive a not-congested indicator (e.g., congestion indicator with a congestion indicator value of 0) or other congestion-related information from the DU that indicates that the congestion condition associated with the one or more DRBs (and DU) has been resolved.

If it is determined that the congestion condition associated with the one or more DRBs has been resolved, at 1116, discarding, from the buffer component, of data packets of PDU sets associated with the one or more DRBs that were experiencing the congestion condition can be discontinued. In some embodiments, if the congestion detector component determines or detects that the congestion condition associated with the one or more DRBs has been resolved, the discard manager component can determine that discarding, from the buffer component, of data packets of PDU sets associated with the one or more DRBs that were experiencing the congestion condition can be discontinued, and, accordingly, can discontinue the discarding, from the buffer component, of data packets of PDU sets associated with the one or more DRBs that were experiencing the congestion condition.

In certain embodiments, in response to determining that the congestion condition has been resolved (e.g., at least momentarily or temporarily), the discard manager component can transition from the active state to the deactivating state, and can set the second timer (e.g., the congestion resolution wait timer) for the second defined amount of time (which can be same as or different from the first defined amount of time). While in the deactivating state, the discard manager component can discontinue the discarding of data packets of PDU sets associated with the group of DRBs from the buffer component at least due to congestion-related issues (although the discard manager component still may discard a data packet of a PDU set for another reason, other than congestion), such as described herein. If no congestion condition associated with the group of DRBs is detected during the time period the discard manager component is in the deactivating state and the second defined amount of time expires or elapses, the discard manager component can transition to the inactive state, wherein, while in the inactive state, the discard manager component will not discard data packets of PDU sets associated with the group of DRBs from the buffer component at least due to congestion-related issues (although the discard manager component still may discard a data packet of a PDU set for another reason, other than congestion), such as described herein.

At this point, with the congestion condition being determined to be resolved, the method 1100 can proceed to reference point B, wherein the method 1100 can proceed from reference point B back to reference numeral 1102 where the monitoring of the group of DRBs associated with the DU can continue. For instance, in response to determining that the congestion condition associated with the one or more DRBs of the group of DRBs has been resolved (e.g., for at least the second defined amount of period, and the transitioning from the deactivating state to the inactive state), the discard manager component (e.g., employing the congestion detector component) can continue to monitor the group of DRBs associated with the DU (e.g., for each DU) to facilitate detecting whether there is a congestion condition associated with any of the DRBs associated with the DU and CU-UP.

Referring again to reference numeral 1114, if, instead, at 1114, it is determined that the congestion condition associated with the one or more DRBs has not been resolved, at 1118, an adjustment to the threshold priority level (or a previously adjusted threshold priority level, if any) can be determined based at least in part on a current lowest priority level associated with any of the PDU sets that are present in the buffer component and are associated with the one or more DRBs that are experiencing the congestion condition, the threshold priority level (or the previously adjusted threshold priority level, if any), and a defined adjustment value. In some embodiments, if, while in the active state, the discard manager component determines that the congestion condition associated with the one or more DRBs has not been resolved, the discard manager component can remain in the active state. In certain embodiments, if there was a determination that the congestion condition had at least momentarily or temporarily had been resolved, the discard manager component can transition from the active state to the deactivating state, such as described herein. If, while in the deactivating state and before the second defined amount of time expires or elapses, the congestion detector component again detects a congestion condition associated with one or more DRBs of the group of DRBs, the discard manager component can determine that the congestion condition has not been resolved, can transition from the deactivating state back to the active state, and can resume discarding, from the buffer component, PDU sets associated with one or more DRBs that are experiencing the congestion condition, such as described herein.

If the discard manager component determines that the congestion condition associated with the one or more DRBs has not been resolved, the discard manager component can determine that discarding of data packets of PDU sets associated with the one or more congested DRBs can continue, can determine that an adjustment or update can be made to the threshold priority level (or the previously adjusted threshold priority level, if any), and can determine the adjusted threshold priority level based at least in part on (e.g., as a function of) the current lowest priority level (e.g., a current highest PSI value) associated with any of the PDU sets that are present in the buffer component and associated with the one or more DRBs that are experiencing the congestion condition, the threshold priority level (or the previously adjusted threshold priority level, if any), and the defined adjustment value (e.g., a defined step size). For example, with regard to PSI values, the discard manager component can determine (e.g., calculate) the adjusted threshold priority level as the minimum of the current highest PSI value associated with any of the PDU sets that are present in the buffer component and are associated with the one or more congested DRBs, which are experiencing the congestion condition, and a total value of the current threshold PSI value minus the defined adjustment value (e.g., the defined step size), such as described herein. In some instances, the adjustment or update to the threshold priority level (or the previously adjusted threshold priority level, if any) can correspond to an increase in priority level (e.g., a decrease in the PSI value) of the threshold priority level (or previously adjusted threshold priority level). In certain instances, depending on the results of the adjustment or update determination (e.g., calculation), the adjustment or update to the threshold priority level (or the previously adjusted threshold priority level, if any) may be none or zero (e.g., the adjusted threshold priority level (or corresponding adjusted threshold PSI value) can be the same as the threshold priority level or previously adjusted threshold priority level (or corresponding threshold PSI value or previously adjusted threshold PSI value)). The discard manager component can set the adjusted threshold priority level (e.g., the adjusted threshold PSI value) as determined (e.g., calculated) by the discard manager component.

At 1120, one or more data packets of one or more PDU sets associated with the one or more DRBs experiencing the congestion condition and having a priority level that satisfies the adjusted threshold priority level can be discarded from the buffer component. The discard manager component can discard, from the buffer component, the one or more data packets of the one or more PDU sets that are associated with the one or more congested DRBs and have the priority level that is determined to satisfy the adjusted threshold priority level (e.g., discard one or more data packets of one or more PDU sets that have PSI values that are at or higher than the adjusted threshold PSI value).

In some embodiments, at this point, the method 1100 can return to reference numeral 1112, wherein the group of DRBs associated with the DU can continue to be monitored, and the method 1100 can continue from that point. As disclosed, the discard manager component, employing the congestion detector component, can continue to monitor the group of DRBs associated with the DU to facilitate determining whether the congestion condition experienced by the one or more DRBs is resolved or, instead, continues to exist, and/or otherwise determine whether there are any other changes in the congestion associated with the group of DRBs (e.g., a change in which DRBs are experiencing the congestion condition).

Figure 13:
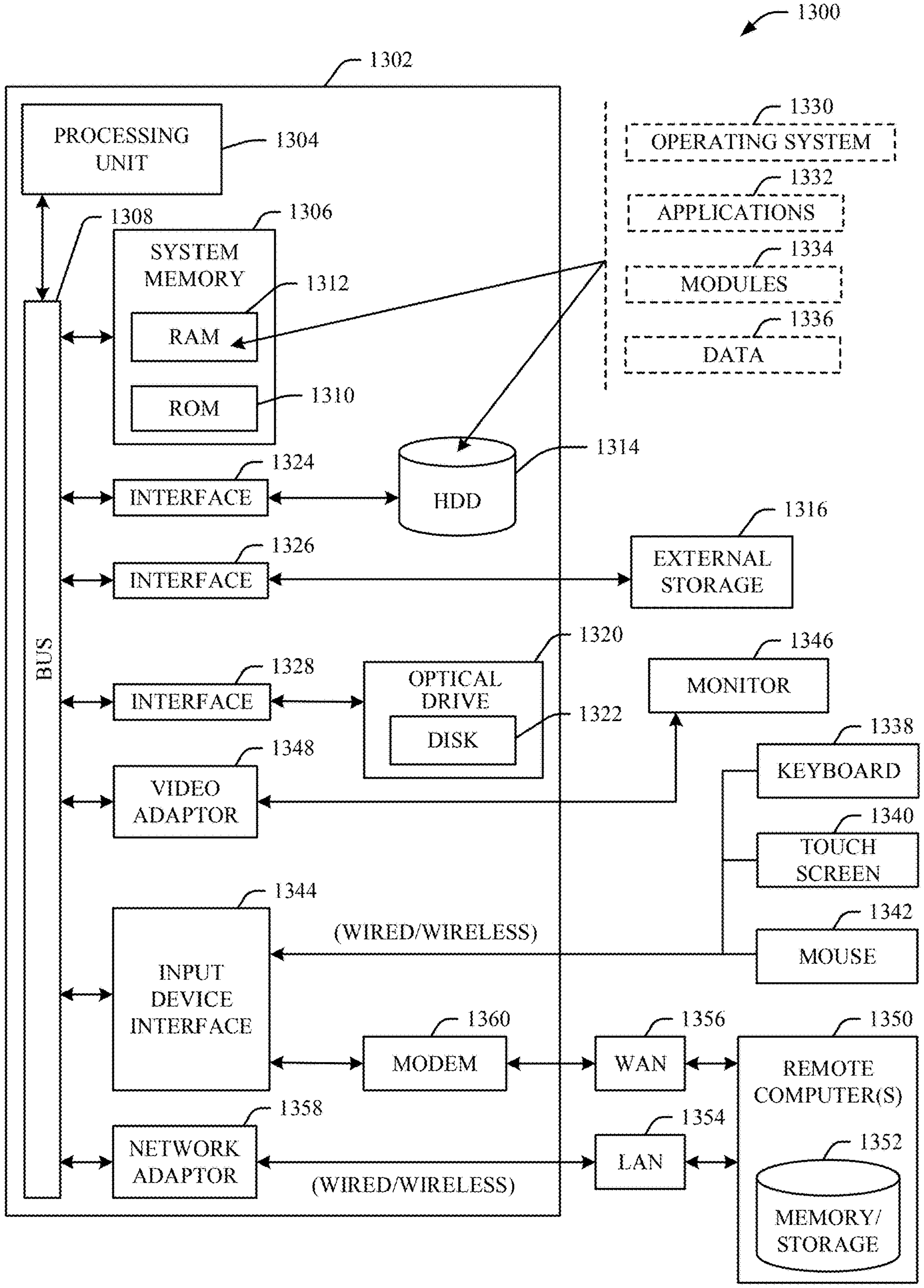
FIG. 13 illustrates an example block diagram of an example computing environment in which the various embodiments of the embodiments described herein can be implemented.

In order to provide additional context for various embodiments described herein, FIG. 13 and the following discussion are intended to provide a brief, general description of a suitable computing environment 1300 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 also can be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356, e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), IoT device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, UE, communication network, core network, RAN, base station, discard manager component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

determining, by a system comprising at least one processor, that a congestion condition exists with regard to a downlink connection associated with a data resource bearer associated with a distributed unit at a first time and continues to exist at a second time that occurs a defined amount of time after the first time based on congestion information associated with the data resource bearer and based on expiration of the defined amount of time of a timer initiated at the first time, wherein the congestion information comprises a congestion indicator that indicates the data resource bearer is experiencing the congestion condition; and in response to determining that the congestion condition exists at the first time, and in response to determining that the congestion condition continues to exist at the second time:

transitioning, by the system, from an inactive state to an active state;

during the active state, determining, by the system, from a group of protocol data unit sets stored in a buffer memory of a central unit user plane and associated with a group of data resource bearers, comprising the data resource bearer, a data packet of a protocol data unit set to discard based on a priority level associated with the protocol data unit set as compared to other priority levels of other protocol data unit sets of the group of protocol data unit sets, wherein the protocol data unit set is associated with the data resource bearer; and during the active state, in response to determining that the data packet of the protocol data unit set is to be discarded, discarding, by the system, the data packet of the protocol data unit set from the buffer memory.

2. The method of claim 1, further comprising:

receiving, by the system, from the distributed unit, the congestion indicator that indicates the data resource bearer associated with the distributed unit is experiencing the congestion condition with regard to the downlink connection.

3. The method of claim 2, wherein the congestion indicator is contained in a header of a downlink data delivery status frame associated with the data resource bearer.

4. The method of claim 1, wherein the congestion condition is located in the distributed unit or the central unit user plane associated with the group of data resource bearers.

5. The method of claim 1, further comprising:

determining, by the system, that the priority level associated with the protocol data unit set is lower than the other priority levels associated the other protocol data unit sets of the group of protocol data unit sets, wherein the determining, from the group of protocol data unit sets, the data packet of the protocol data unit set to discard comprises determining, from the group of protocol data unit sets, that the data packet of the protocol data unit set is to be discarded based on the determining that the priority level associated with the data packet of the protocol data unit set is lower than the other priority levels associated the other protocol data unit sets of the group of protocol data unit sets; and setting, by the system, a threshold priority level relating to discarding of data packets of protocol data unit sets based on the priority level being determined to be lower than the other priority levels.

6. The method of claim 5, wherein the group of protocol data unit sets is a first group of protocol data unit sets, wherein the protocol data unit set is a first protocol data unit set, wherein the data packet is a first data packet, wherein the priority level is a first priority level, wherein the setting of the threshold priority level occurs at the first time, and wherein the method further comprises:

with regard to a second group of protocol data unit sets, comprising a second protocol data unit set, associated with the group of data resource bearers and stored in the buffer memory at the second time subsequent to the first time, determining, by the system, whether any respective priority levels associated with any respective protocol data unit sets of the second group of protocol data unit sets satisfies the threshold priority level; and in response to determining that a second priority level associated with a second data packet of the second protocol data unit set satisfies the threshold priority level, determining, by the system, that the second data packet of the second protocol data unit set is to be discarded from the buffer memory.

7. The method of claim 5, wherein the data resource bearer is a first data resource bearer, wherein the protocol data unit set is a first protocol data unit set, wherein the data packet is a first data packet, wherein the priority level is a first priority level, wherein a second data resource bearer is not part of the group of data resource bearers, wherein a second data packet of a second protocol data unit set associated with a second priority level and associated with the second data resource bearer is stored in the buffer memory, wherein the second priority level is lower than the first priority level, wherein the group of data resource bearers is experiencing the congestion condition, and wherein the method further comprises:

determining, by the system, that no congestion condition exists with regard to the second data resource bearer based on not-congested information associated with the second data resource bearer, wherein the not-congested information indicates that no congestion condition exists with regard to the second data resource bearer, wherein the setting comprises setting the threshold priority level relating to discarding of data packets of protocol data unit sets to the first priority level, even though the second priority level is lower than the first priority level, based on the determining that no congestion condition exists with regard to the second data resource bearer, and based on the first priority level being determined to be lower than the other priority levels associated the other protocol data unit sets of the group of protocol data unit sets associated with the group of data resource bearers that is experiencing the congestion condition; and determining, by the system, that, even though the second priority level is lower than the first priority level and the threshold priority level, the second data packet of the second protocol data unit associated with the second priority level is not to be discarded based on the determining that no congestion condition exists with regard to the second data resource bearer.

8. The method of claim 5, wherein the setting of the threshold priority level occurs at the first time, wherein the group of data resource bearers is experiencing the congestion condition, wherein the protocol data unit set is a first protocol data unit set, wherein the priority level is a first priority level, wherein the congestion information is first congestion information, wherein the threshold priority level is a first threshold priority level, and wherein the method further comprises:

at a third time subsequent to the second time, determining, by the system, that the congestion condition has not been resolved with regard to the group of data resource bearers based on second congestion information associated with the group of data resource bearers; and in response to determining, at the third time, that the congestion condition has not been resolved, determining, by the system, a second threshold priority level relating to discarding of protocol data unit sets as a function of a second priority level associated with a second protocol data unit set associated with the group of data resource bearers and stored in the buffer memory at the third time, the first threshold priority level, and a defined adjustment value, wherein the second priority level is determined to be lowest of respective priority levels associated with respective protocol data unit sets stored in the buffer memory at the third time.

9. The method of claim 8, wherein respective priority level values range from a lowest priority level value to a highest priority level value, wherein the lowest priority level value is a highest priority level, wherein the highest priority level value is a lowest priority level, wherein a first priority level value corresponds to the first priority level, wherein a second priority level value corresponds to the second priority level, wherein the first threshold priority level is a first threshold priority level value that is the first priority level value, and wherein the method further comprises:

determining, by the system, a total value that is equal to the first threshold priority level value minus the defined adjustment value, wherein the determining of the second threshold priority level comprises determining a second threshold priority level value, corresponding to the second threshold priority level, as a minimum of the second priority level value and the total value; and setting, by the system, the second threshold priority level value for use, subsequent to the third time, to facilitate determining whether to discard any data packets of any protocol data unit sets stored in the buffer memory and associated with the group of data resource bearers experiencing the congestion condition.

10. The method of claim 1, wherein the data resource bearer is a first data resource bearer, wherein the timer is a first timer, wherein the defined amount of time is a first defined amount of time, wherein the congestion indicator is a first congestion indicator, and wherein the method further comprises:

at a third time, in response to receiving not-congested information indicating that the congestion condition is resolved:

initiating, by the system, a second timer set for a second defined amount of time, and transitioning, by the system, from the active state to a deactivating state, wherein no data packet of any protocol data unit set is discarded during the deactivating state; and one of:

at a fourth time, prior to expiration of the second defined amount of time of the second timer, in response to receiving a second congestion indicator that indicates a second congestion condition exists with regard to the first data resource bearer or a second data resource bearer of the group of data resource bearers, transitioning, by the system, from the deactivating state back to the active state, or at a fifth time, in response to determining that the second defined amount of time of the second timer has expired, and in response to determining that no congestion condition exists with regard to the first data resource bearer or any other data resource bearer of the group of data resource bearers, transitioning, by the system, from the deactivating state to the inactive state.

11. The method of claim 1, wherein data traffic associated with the protocol data unit set is related to an extended reality service or a service that involves communication of data bursts comprising protocol data unit sets.

12. A system, comprising:

at least one memory that stores computer executable components; and at least one processor that executes computer executable components stored in the at least one memory, wherein the computer executable components comprise:

a congestion detector that detects that a congestion condition associated with a data resource bearer of a group of data resource bearers exists at a first time and also exists at a second time that occurs a defined period of time after the first time based on congestion information associated with the group of data resource bearers and based on expiration of a timer that was set for the defined period of time and was initiated at the first time, wherein the congestion information comprises a congestion indicator that indicates the data resource bearer is experiencing the congestion condition, and wherein the data resource bearer is associated with a distributed unit; and a discard manager, wherein, in response to detecting that the congestion condition exists at the first time and also exists at the second time, the discard manager transitions from an inactive state to an active state, and, during the active state, determines, from a group of protocol data unit sets present in a buffer memory of a central unit user plane and associated with the group of data resource bearers, a data packet of a protocol data unit set to discard based on a priority level associated with the protocol data unit set as compared to other priority levels of other protocol data unit sets of the group of protocol data unit sets, and wherein, during the active state, in response to determining that the data packet of the protocol data unit set is to be discarded, the discard manager discards or initiates discarding of the data packet of the protocol data unit set from the buffer memory.

13. The system of claim 12, wherein the congestion detector receives, from the distributed unit, the congestion indicator that indicates the data resource bearer is experiencing the congestion condition with regard to a downlink connection, and wherein the congestion indicator is contained in a header of a downlink data delivery status frame associated with the data resource bearer.

14. The system of claim 12, wherein the congestion condition is located in the distributed unit or the central unit user plane associated with the group of data resource bearers, wherein the discard manager determines that the priority level associated with the protocol data unit set is lower than the other priority levels associated the other protocol data unit sets of the group of protocol data unit sets, and wherein, in response to determining that the priority level associated with the protocol data unit set is lower than the other priority levels associated the other protocol data unit sets of the group of protocol data unit sets, the discard manager determines, from the group of protocol data unit sets, that the data packet of the protocol data unit set is to be discarded, discards or initiates discarding of the data packet of the protocol data unit set from the buffer memory, and sets a threshold priority level relating to discarding of data packets of protocol data unit sets based on the priority level.

15. The system of claim 14, wherein the group of protocol data unit sets is a first group of protocol data unit sets, wherein the protocol data unit set is a first protocol data unit set, wherein the data packet is a first data packet, wherein the priority level is a first priority level, wherein the discard manager set the threshold priority level at the first time, wherein, with regard to a second group of protocol data unit sets, comprising a second protocol data unit set, associated with the group of data resource bearers and present in the buffer memory at the second time subsequent to the first time, the discard manager determines whether any respective priority levels associated with any respective protocol data unit sets of the second group of protocol data unit sets satisfies the threshold priority level, and wherein, in response to determining that a second priority level associated with a second data packet of the second protocol data unit set satisfies the threshold priority level, the discard manager determines that the second data packet of the second protocol data unit set is to be discarded, and discards or initiates discarding of the second data packet from the buffer memory.

16. The system of claim 14, wherein the data resource bearer is a first data resource bearer, wherein the protocol data unit set is a first protocol data unit set, wherein the data packet is a first data packet, wherein the priority level is a first priority level, wherein a second data resource bearer is not part of the group of data resource bearers, wherein a second protocol data unit set associated with a second priority level and associated with the second data resource bearer is present in the buffer memory, wherein the second priority level is lower than the first priority level, wherein the congestion detector determines that no congestion condition is detected with regard to the second data resource bearer based on not-congested information associated with the second data resource bearer, wherein the not-congested information indicates that no congestion condition exists with regard to the second data resource bearer, wherein the discard manager sets the threshold priority level relating to discarding of protocol data unit sets to the first priority level, even though the second priority level is lower than the first priority level, based on no congestion condition being detected with regard to the second data resource bearer, and based on the first priority level being determined to be lower than the other priority levels associated the other protocol data unit sets of the group of protocol data unit sets associated with the group of data resource bearers that is experiencing the congestion condition, and wherein the discard manager determines that, even though the second priority level is lower than the first priority level and the threshold priority level, a second data packet of the second protocol data unit associated with the second priority level is not to be discarded from the buffer memory based on no congestion condition being detected with regard to the second data resource bearer.

17. The system of claim 14, wherein the discard manager sets the threshold priority level at the first time, wherein the protocol data unit set is a first protocol data unit set, wherein the priority level is a first priority level, wherein the congestion information is first congestion information, wherein the threshold priority level is a first threshold priority level, wherein, at a third time subsequent to the first time, the congestion detector determines that the congestion condition has not been resolved with regard to the group of data resource bearers based on second congestion information associated with the group of data resource bearers, wherein, in response to the congestion detector determining that the congestion condition has not been resolved with regard to the group of data resource bearers, the discard manager determines a second threshold priority level relating to discarding of data packets of protocol data unit sets as a function of a second priority level associated with a second protocol data unit set associated with the group of data resource bearers and present in the buffer memory at the third time, the first threshold priority level, and a defined adjustment factor, and wherein the second priority level is determined to be lowest of respective priority levels associated with respective protocol data unit sets present in the buffer memory at the third time.

18. A non-transitory machine-readable medium, comprising executable instructions that, when executed by at least one processor, facilitate performance of operations, comprising:

detecting that a congestion condition associated with a data resource bearer of a group of data resource bearers associated with a distributed unit is present at a first time and is present at a second time that occurs a defined amount of time after the first time based on congestion information associated with the group of data resource bearers and based on expiration of the defined amount of time of a timer initiated at the first time, wherein the congestion information comprises a congestion indicator that indicates the congestion condition associated with the data resource bearer is present; and in response to detecting that the congestion condition is present at the first time and is present at the second time:

switching from an inactive state to an active state;

during the active state, determining, from a group of protocol data unit sets present in a buffer memory of a central unit user plane and associated with the group of data resource bearers, a data packet of a protocol data unit set that is to be disposed based on a priority level associated with the protocol data unit set relative to other priority levels of other protocol data unit sets of the group of protocol data unit sets, wherein the protocol data unit set is associated with the data resource bearer of the group of data resource bearers; and during the active state, in response to determining that the data packet of the protocol data unit set is to be disposed, disposing of the data packet of the protocol data unit set from the buffer memory.

19. The non-transitory machine-readable medium of claim 18, wherein the operations comprise:

receiving, from the distributed unit, the congestion indicator that indicates the data resource bearer associated with the distributed unit is experiencing the congestion condition with regard to a downlink connection, wherein the congestion indicator is contained in a header of a downlink data delivery status frame associated with the data resource bearer.

20. The method of claim 1, further comprising:

performing, utilizing an artificial intelligence model of the system, an artificial intelligence-based analysis on data relating to an time amount settings of the timer or threshold priority levels associated with the protocol data unit sets;

based on a result of the artificial intelligence-based analysis on the data, inferring, utilizing the artificial intelligence model of the system, a first adjustment of the defined amount of time of the timer or a second adjustment of a threshold priority level relating to discarding of data packets of protocol data unit sets; and adapting, by the system, the defined amount of time based on the first adjustment, or the threshold priority level based on the second adjustment.

* * * * *